United States Patent
Amura

(10) Patent No.: US 11,551,724 B2
(45) Date of Patent: Jan. 10, 2023

(54) SYSTEM AND METHOD FOR PERFORMANCE-BASED INSTANT ASSEMBLING OF VIDEO CLIPS

(71) Applicant: Mario Amura, Torre Annunziata (IT)

(72) Inventor: Mario Amura, Torre Annunziata (IT)

(73) Assignee: REGENALL LIMITED, London (GB)

( * ) Notice: Subject to any disclaimer, the term of this patent is extended or adjusted under 35 U.S.C. 154(b) by 0 days.

(21) Appl. No.: 17/600,824

(22) PCT Filed: Mar. 31, 2020

(86) PCT No.: PCT/EP2020/059150
§ 371 (c)(1),
(2) Date: Oct. 1, 2021

(87) PCT Pub. No.: WO2020/201297
PCT Pub. Date: Oct. 8, 2020

(65) Prior Publication Data
US 2022/0180901 A1    Jun. 9, 2022

(30) Foreign Application Priority Data
Apr. 1, 2019  (IT) .................. 102019000004823

(51) Int. Cl.
*G11B 27/036*     (2006.01)
*G11B 27/034*     (2006.01)
*G11B 27/34*      (2006.01)

(52) U.S. Cl.
CPC .......... *G11B 27/036* (2013.01); *G11B 27/034* (2013.01); *G11B 27/34* (2013.01)

(58) Field of Classification Search
CPC ...... G11B 27/036; G11B 27/034; G11B 27/34
See application file for complete search history.

(56) References Cited

U.S. PATENT DOCUMENTS 8,745,500 B1   6/2014  Kostello et al.
9,176,610 B1   11/2015 Kruge et al.
(Continued)

FOREIGN PATENT DOCUMENTS

WO    2016/001793 A1    1/2016

OTHER PUBLICATIONS

International Search Report dated Jun. 2, 2020 issued in PCT/EP2020/059150.
(Continued)

*Primary Examiner* — Thai Q Tran
*Assistant Examiner* — Jose M Mesa
(74) *Attorney, Agent, or Firm* — Scully, Scott, Murphy & Presser, P.C.

(57) ABSTRACT

A system for instant assembly of video clips through user's interactive performance, comprising a device operated by a user, wherein the device comprises:
  user interface means configured for input and output interaction with the user;
    a processing unit and a memory configured for the creation of a new video assembled appending a plurality of video clip segments extracted from a plurality of video clips; and
    an I/O unit configured for access to the plurality of video clips;
  the user interface means are configured to detect a sequence of manual assembling commands, and to display the plurality of video clip segments, the display order of the video segments being defined by the sequence of manual concatenation commands;
  the processing unit and the memory are configured to record the appending process of the video segments extracted from a plurality of video clips.

19 Claims, 20 Drawing Sheets

(56) References Cited

U.S. PATENT DOCUMENTS

2010/0088726 A1* 4/2010 Curtis .................. G11B 27/034
725/45
2015/0058733 A1 2/2015 Novikoff

OTHER PUBLICATIONS

Written Opinion dated Jun. 2, 2020 issued in PCT/EP2020/059150.
Italian Search Report and Written Opinion dated Nov. 27, 2018 issued in IT 201900004823, with partial translation.
Museo di Scultura Antica Giovanni Barracco: "Guida al contest Suona il tuo museo con phlay", Museo di Scultura Antica Giovanni Barracco (Dec. 9, 2017), Retrieved from the Internet: URL:http://museobarracco.it/ennode/100075 1/attachment [retrieved on Nov. 25, 2019], cited in ISR and Italian SR.

* cited by examiner

SOFTWARE CONFIGURATION SYSTEM

SCHEMATIC VIEW OF PERFORMANCE RECORDING GUI IN "BASIC OPERATING MODE"

OVERALL FLOWCHART OF LOCAL PBVF DATA-PACK AUTHORING PROCEDURE

OVERALL FLOWCHART OF VIDEO CLIP ASSEMBLY METHOD WITHIN LOCAL DATA-PACK AUTHORING PROCEDURE

SYSTEM AND METHOD FOR PERFORMANCE-BASED INSTANT ASSEMBLING OF VIDEO CLIPS

The present invention relates to a system and a method for instant assembling of video clips through user's interactive performance.

In particular, the present invention relates to the interactive creation of original audiovisual content inspired by listening to music and achieved through instant assembling of pre-synchronized video clips by means of a number of novel assembling methods also designed to preserve synchronization of the video clips to a common soundtrack; wherein availability of the video clips, beside depending from a previous authoring process, can also depend on reward criteria, possibly based on real-time analysis of user's interactive performance and ability in spotting key-images. For this reason, the present invention is not only useful and practical in the field of video editing applications, but above all it is useful and practical in the field of audiovisual applications offering a gaming experience.

STATE OF ART

Over the past two decades, the concept of nonlinear video clips editing, along with uninterrupted progress of the underlying enabling technologies, has revolutionized the world of professional and amateur video making, providing powerful and reliable tools to select, assemble, refine, add effects, pre-visualize and finalize video clips. As a consequence of this, a plethora of both mobile and desktop hardware platforms and software applications are available today, providing advanced video editing tools and functions to a wide audience of users in many application contexts.

Most of these known solutions implement offline editing of available content (i.e. a type of editing not performed simultaneously with the creation of content) through a consolidated operational paradigm according to which a certain selection of video clips (possibly, subject to normalization of the aspect ratio and appropriate redefinition of the duration) can be freely assembled in the desired order within a timeline, or through the use of a variety of transition effects.

The provisional result can be pre-visualized (typically with reduced resolution and quality) at the desired frame rate and refined through further processing steps or adjustments of various parameters and, finally, the result of this process can be finalized obtaining a full quality video in a variety of digital formats (both compressed and without compression).

Some known video editing systems also provide real-time (often limited) editing capabilities, such as the instant insertion of a clip, or may provide the possibility of recording and inserting live content.

Simplified versions of the known video editing systems are also used for the creation of slideshows in which the author can specify which images to include and an audio file to be reproduced as a soundtrack. In this type of application, the visualization order and duration of each image can be pre-determined, randomly assigned or specified by the user during a video editing session that often requires a long and repetitive process.

Some known systems and methods for sampling audio-musical backing tracks (such as U.S. Pat. No. 9,176,610 B1 Kruge Nick [Us] Et Al) enable the assembling of various music video clips in real time by concatenating them manually. In this case, the video clips assembling method does not offer any reward mechanism based on user performance, nor does it support any assembling method based on the pre-synchronization of video clips with each other and with an audio track, and nor does it support any assembling method based on the off-sync insertion of pre-indexed segments of video clips associated to a tag.

Some known systems and methods (such as US B 745 500 B1) enable the recording of a number of video clips, each associated to a corresponding thumbnail, to be used for on-the-fly assembling process by tapping on the thumbnails. Even in this case, the video clips assembling method does not offer any reward mechanism based on user performance, nor does it support any assembling method based on the pre-synchronization of video clips with each other and with an audio track.

Some known systems and methods (such as US 2015/058733 A1) enable gesture-based video clips editing through a preview display showing the resulting in-progress video. However, these systems rely on conventional non-linear editing approaches which do not offer any reward mechanism based on user performance, nor does it support any assembling method based on the pre-synchronization of video clips with each other and with an audio track and assembling method based on the off-sync insertion of pre-indexed video clips segments associated to a tag. In light of the above, none of the known systems described above is aimed at enabling a video creation process based on an impromptu user performance comparable to a gaming experience.

SUMMARY OF THE INVENTION

The aim of the present invention is to overcome the limits of the state-of-the-art, as set out above, by devising an original system and method for instant assembling of video clips through user performance that allow to obtain better results than those obtainable with known solutions and/or similar results at lower cost and with higher performance.

Within this aim, an object of the present invention is to devise a system and method for the instant assembling of video clips through performance by providing original assembling methods and interaction paradigms for creating audiovisual sequences in real-time according to the user performance.

Another object of the present invention is to devise a system and a method for performance-based instant assembling of video clips that enables and fosters a music-inspired approach to video-making, designed for this purpose with regard to video clips assembling features offered, operational paradigms and user interfaces. To this regard, a key aspect of the present invention is the capability to guarantee a consistent syncing among n video clips and the main soundtrack throughout the whole interactive creation process, by means of a specifically designed assembling systems and methods.

A further object of the present invention is to devise a system and a method for the instant assembling of video clips through user performance, where user performance can be analyzed in real-time and, based on this analysis, a reward method can unlock access to, or even suggest, additional video clips.

Moreover, another object of the present invention is to devise a system and a method for instant assembling of video clips through user's interactive performance where each single video-making session results to be unique, being based exclusively on user's instant visual-acoustic perception and consequent gestural interaction, as well as on the availability of specific video clips which in turn can depend on the unique interaction pattern performed by the user.

A further object of the present invention is to provide a system and a method for instant assembling of video clips by means of user performance, resulting highly efficient, intuitive to use, and economically competitive when compared to the state-of-the-art.

This aim, as well as these and other objects which will become better apparent hereinafter, are achieved by a system for instant assembling of video clips through user performance, comprising a device operated by a user, wherein said device comprises:

user interface means configured for input and output interfacing with said user;
   a processing unit and a memory configured to (run a computer program suitable for) the creation of an assembled video by appending one after the other a plurality of segments of said video clips;
   an I/O unit configured to access said plurality of video clips locally or through a computer network;
   said user interface means are configured to detect a sequence of manual assembling commands operated by said user and to reproduce one after the other said plurality of segments of video clips extracted from said plurality of video clips, the order of display of the video clips being defined by said sequence of manual assembling commands and the related set of video clips assembling algorithms indicated in the data pack in Additional Info 350;
   said processing unit and said memory are configured to record one after the other said plurality of video clips segments extracted from said plurality of video clips, resulting in the final assembled video 301, the assembling order of the video clips being defined by said sequence of manual assembling commands;
   where the detection of a manual assembling command triggers the transition from a given video clip, currently displayed, to another video clip.

All available video clips, any audio content, any performances already prepared and various additional information, are specified by a data-pack that can be transferred to the device, purpose of the invention, through a number of modes which include, but are not limited to computer networks, or through local authoring procedure. The aforementioned data-pack complies with a multimedia representation format called PB VF (Performance Based Video Format), which formally defines the types and data structures necessary to support the functionalities of this system and method for the reproduction, recording and sharing of audiovisual content.

In an embodiment of the system for the instant assembling of video clips through user performance, said device further comprises a speaker configured to reproduce any audio content, said I/O unit being configured to access said audio content in local or through said computer network, said processing unit and said memory being configured to record said audio content in combination with said video clips, comprising said plurality of video clips segments extracted from said plurality of video clips.

In one embodiment of the invention, the system for instant assembling of video clips through performance further includes:

a storage unit on the cloud server, configured for the storage of said plurality of video clips and optionally of said audio content; and
   a video processing and generation unit on the cloud server, configured for the streaming transmission of said plurality of video clips and optionally of said audio content towards said device.

In an embodiment of the invention, the system for instant assembling of video clips through user performance further comprises a web authoring and publishing platform on the cloud server, configured for the creation of a data-pack that defines said plurality of video clips, said possible audio content, said sequence of manual assembling commands and other functions, and for the publication of said data-pack.

In an embodiment of the invention, the system for instant assembling of video clips through user performance further comprises a local authoring procedure on said device, configured for the creation of a data-pack that defines said plurality of video clips 320, said any audio content 330, said sequence of manual assembling commands 340, 350, 390 and other functions.

In an embodiment of the invention, the system for instant assembling of video clips through user performance further comprises a method for enabling a hidden portion 351, 352 of said plurality of video clips and of said audio content, wherein this hidden portion 351, 352 is made accessible according to reward criteria based on the real-time analysis of said sequence of manual assembling commands.

In an embodiment of the system for the instant assembling of video clips through user performance according to the invention, the user interface means of the device are configured according to an operating mode called TAG_BASED, with related commands and associated natural user interface, which allows the selective insertion of video clips segments extracted from said plurality of video clips, previously indexed during the data-pack authoring procedure, through manual annotation or through automatic image analysis method.

In an embodiment of the system for the instant assembling of video clips through user performance according to the invention, said user interface means of said device are configured according to an operating mode called TAIL_REPEAT, with relative commands and associated graphic layout, which allows to repeat a tail segment of a video clips, currently displayed and recorded, possibly altering the order of the frames.

In an embodiment of the invention, the system for instant assembling of video clips through user's performance can operate without any audio content for the purpose of assembling said plurality of video clips extracted from said plurality of video clips through user performance, the display order of the video clips being defined by said sequence of manual assembling commands.

The aim of present invention is also achieved by a method for instant assembling of video clips through user performance, through a device operated by a user, comprising the steps which consist in:

accessing a plurality of video clips locally or through a computer network, via an I/O unit of said device;
   detecting a sequence of manual assembling commands operated by said user, via user interface means of said device;
   reproducing one after the other a plurality of video clips segments extracted from said plurality of video clips, through said user interface means of said device, the display order of the video clips segments being defined by said sequence of manual assembling commands; and
   recording one after the other said plurality of segments of video clips 321-325 extracted from said plurality of video clips, resulting in the final assembled video 301, the order of registration of the segments of video clips being defined by said sequence of manual assembling commands;

where the detection of a manual assembling command triggers the transition from a given video clip, currently displayed to another video clip.

In one embodiment of the invention, the method for instant assembling of video clips through user performance further includes the steps which consist of:

accessing audio content locally or through said computer network, through said I/O unit of said device;

reproducing said audio content, through a loudspeaker of said device; and recording said audio content in combination with said video clips, comprising said plurality of video clips segments extracted from said plurality of video clips, through said processing unit and said memory of said device.

In one embodiment of the invention, the method for instant assembling of video clips through performance further includes the steps which consist of:

storing said plurality of video clips and optionally said audio content, via a storage unit on a cloud server; and streaming said plurality of video clips 321-325, 351-352 and optionally of said audio content towards said device, by means of a video processing and rendering unit on a cloud server.

In one embodiment of the invention, the method for instant assembling of video clips through user performance is based on a previously authored data-structure, hereafter referenced as data-pack, to determine the number and the kind of available video clips along with the audio track these video clips are synchronized to and the number and type of available assembling algorithms and related interface layouts, according to the steps of:

creating a data-pack that defines said plurality of video clips 320 content, said possible audio content, said sequence of manual assembling commands and other functionalities, through a web authoring and publishing platform on cloud server; and publishing said data-pack, through said web authoring and publishing platform on cloud servers.

In one embodiment of the invention, the method for instant assembling of video clips through user performance further includes the steps of:

creating a data-pack that defines said plurality of video clips 320, said audio track if any, sequences of manual assembling commands and other functionalities, by means of a local authoring procedure on said device; and publishing said data-pack via said authoring and publishing web platform on cloud servers.

In one embodiment of the invention, the method for instant assembling of video clips through performance further comprises a procedure for enabling a hidden part of said plurality of video clips and of said audio track, made accessible according to reward criteria based on the real-time analysis of said sequence of manual assembling commands.

BRIEF DESCRIPTION OF THE FIGURES

Further characteristics and advantages of the invention will become more evident from the description of some preferred but not exclusive embodiments of the system and method for instant assembling of video clips by means of user performances according to the invention, illustrated as non-limitative examples with the aid of the attached drawings, in which.

DETAILED DESCRIPTION OF THE INVENTION

Figure 1A:
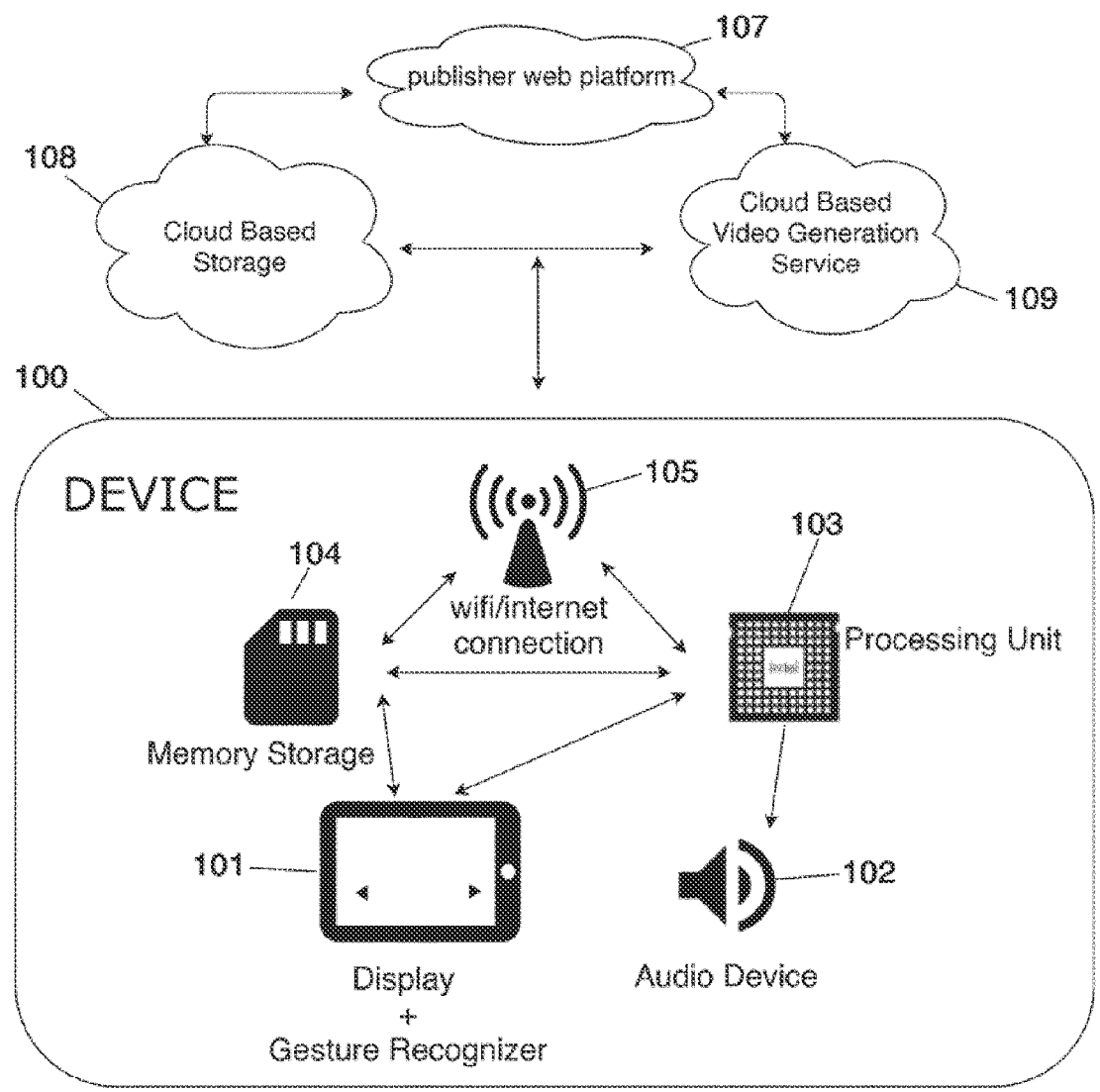
FIG. 1A is a block diagram which schematically depicts the main hardware components of an embodiment of the system for the instant assembling of video clips, according to the present invention.

The present invention relates to a system and method to assemble a plurality of video clips by means of a set of manual controls which allow the user to instantly select which of the available video clips 321-325 351-352, and video clips segments 500 is to be appended, simultaneously with the reproduction of an optional audio track. Video clips availability may depend on reward criteria based on specific algorithms for real-time user performance evaluation.

In this system and method, the sequence of manual assembling commands, which constitutes the interaction performed by the user, is represented univocally through a sequence of indexes which allow a complete reconstruction of the sequence of frames displayed during user performance and the reproduction of the said final assembled video 301, as well as to export this final assembled video to the most popular digital video formats for sharing.

This univocal representation of the sequence of assembling manual commands, i.e. the interaction performed by the user, complies with the specifications of an original multimedia format, also part of the present invention, which formally defines the number and types of video clips, the audio track, any previously defined performance, the user interface and its appearance, the audiovisual effects applicable to the flow of images, as well as any reward criteria based on the evaluation of user interaction pattern and other mechanisms detailed below, which determine the availability of extra video clips otherwise not viewable.

In this system and method, the interaction performed by the user, that produces a new and unique sequence of frames 301, is made through a natural user interface that allows instant choice of the video clips to be displayed at any given time starting from a series of options displayed through the graphical interface, in order to facilitate the creative process.

The available video clips, the content or audio track, and the effect of some of the commands present in the user interface, are defined by a data-package that can be transferred to the device according to the present invention through a multiplicity of modes that can include connections to Wi-Fi or mobile networks, Bluetooth or cable point-to-point connections.

The aforementioned data-package complies with a multimedia representation format called PBVF (Performance Based Video Format), as mentioned before part of the present invention, which formally defines the types and data structures necessary to support the features offered for reproduction, recording and sharing of audiovisual content.

In general, a performance recording phase begins with the display of one of the available video clips 321-325 351-352, and the simultaneous reproduction of the optional associated audio track.

System Architecture

The system for the instant assembling of video clips through user performance according to the present invention is configured to allow the reproduction of an audiovisual content defined in the PBVF multimedia format, described in greater detail later in this document, i.e. the generation of an original video clips through a user performance based on the use of a natural user interface and the simultaneous listening of an optional audio track, which determines the immediate assembling of multiple video clips available in a PBVF data-pack.

With reference to FIG. 1A, the system for the instant assembling of video clips according to the invention includes a local electronic device 100, operated by the user performing the performance, comprising at least the following local hardware components:

- a screen and a gestural graphical user interface or Display and Gesture-Based Graphic User Interface 101 (in short, means of user interface 101), configured for the input and output interaction with a user. The screen provides a display area for all available visual content, such as static images, imported video clips, videos created with the system itself, etc. The gestural graphical user interface provides a terminal for the natural user-system interface that allows the user to control each of the features offered by the system and to receive visual and/or acoustic confirmation of the execution of each command. In one embodiment, this component 101 comprises a touchscreen;
- a loudspeaker or speaker 102 (optional), which reproduces all available audio content, such as imported audio content, audio tracks, audio effects, etc.;
- a processing unit or Processing Unit 103, which includes a CPU and optionally a GPU for executing all the procedures necessary for each of the functions offered by the system, or for each of the required operating steps;
- a memory or Memory 104, used as working memory by the Processing Unit 103 above; and
- an I/O unit or I/O Unit 105, which provides an input and output interface, with or without wires, to communicate with a remote cloud server through a computer network, such as the Internet.

In one embodiment, the system for the instant assembling of video clips according to the invention can further comprise the following remote hardware components:

- a storage unit 108 on a cloud server, which is configured to store the video clips 321-325 and the optional audio track 330, and to provide access to said video clips and audio track via streaming referenced by the data-pack downloaded to the device 100; and
- a video processing and generation unit 109 on a cloud server, configured for simultaneous streaming of said video clips 321-325 and of the optional content or audio track 330 towards the device 100. This unit 109 can be further configured for the reproduction of the content video resulting from the performance, as well as its uploading and remote storage.

In one embodiment, the system for the instant assembling of video clips according to the invention can further comprise the following remote hardware component:

a web authoring and publishing platform 107 on cloud server, configured for the creation of data-packs, preferably in PBVF format, by third parties and for their publication.

Figure 1B:
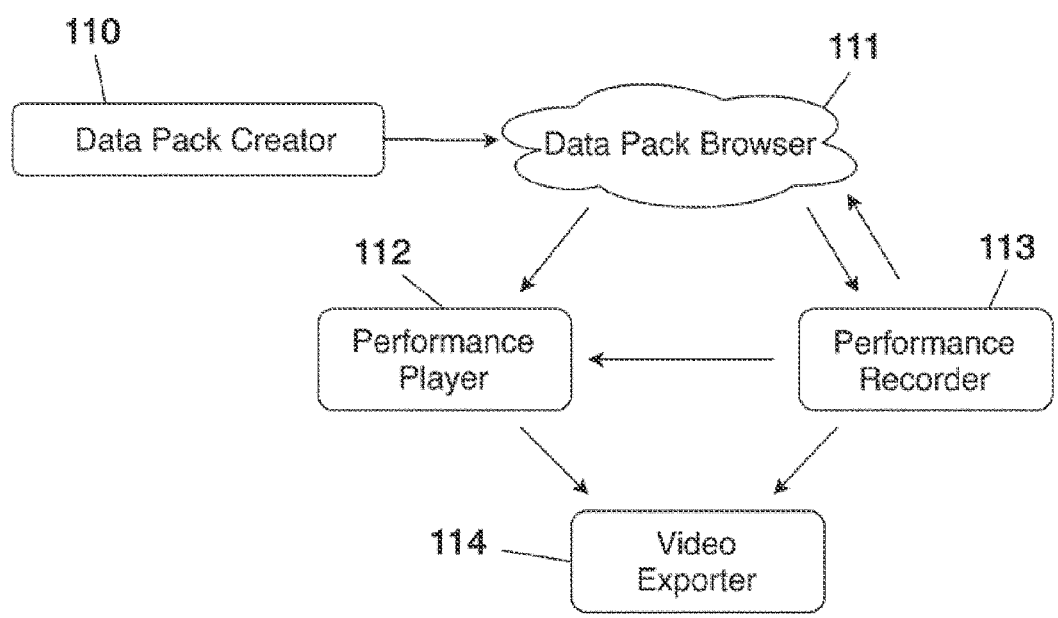
FIG. 1B is a block diagram which schematically depicts the main software components of an embodiment of the system for the instant assembling of video clips, according to the present invention.

With reference to FIG. 1B, the device 100 of the system for the instant assembling of video clips according to the invention includes the following software modules:

Data-pack Creator 110, configured to provide functions for creating a data-pack in PBVF format from locally available video clips 321-325 and audio 330 content;

Data-pack Browser 111, configured for selecting and uploading a data-pack in PBVF format by connecting to a web service, or in local mode;

Performance Player 112, configured to provide specific functions to perform a performance among those available starting from the audio and video clips of the selected data-pack, instantly assembling these video clips or automatically applying the sequence of manual commands shown in the performance;

Performance Recorder 113, configured to provide specific functions to perform an original performance, instantly assembling the video clips specified in the selected data-pack in the preferred order while the optional audio content is simultaneously played; and Video Exporter 114, configured to provide performance rendering functions performed by the user and simultaneously encoded in the PBVF format, in a standard video format.

Operating Principle

As part of the present invention, the process of reproducing or creating a new final assembled video 301 strictly requires the availability, through a computer network, such as the Internet, of a data-pack in PBVF format.

Alternatively, this data-pack can be created through the procedure schematically illustrated in FIGS. 7A and 7B and described in greater detail later in this document, in particular in the section "Local Authoring of PBVF data-packs".

Each data-pack typically includes one or more preview or preview images of its content, one or more performances, i.e. a defined sequence of commands related to a list of video clips determining a final assembled video 301, a variable number of video clips 321-325 and an optional content or audio track 330, possibly available in streaming mode on a web remote server. Starting from a data-pack, the user can choose whether to play the audiovisual content in the Performance Player 112 operating mode via the command interface shown in FIG. 4, or record an original PBVF video in the Performance Recorder 113 operating mode through the command interface shown in FIGS. 5A, 5B and 5C.

Figure 4:
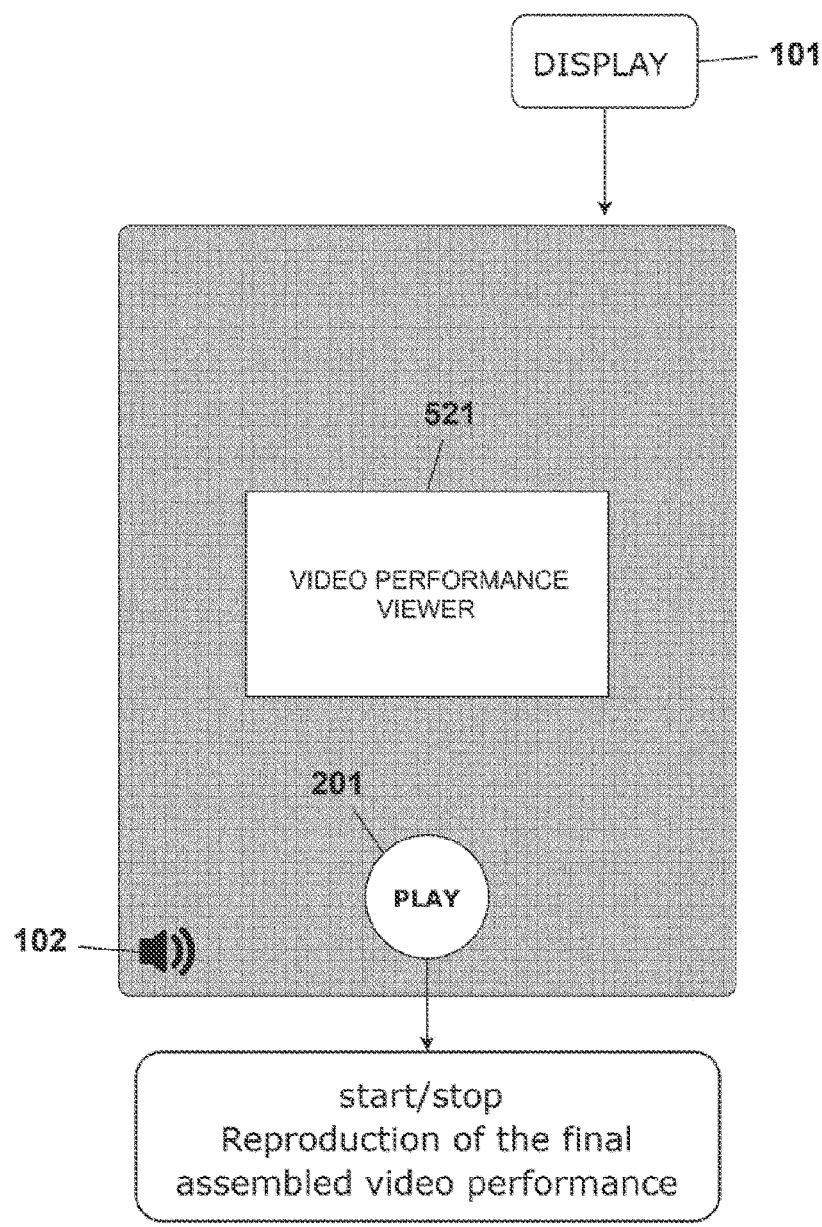
FIG. 4 is a schematic view of the natural user interface in "Performance reproduction" operating configuration, in an embodiment of the instant assembling video clips method according to the present invention.

The command interface shown in FIG. 4, relating to the operating mode Performance Player 112, includes a screen or display 101, a command 201, for example with the "play" or "start" label, to start playback of the video performance, and the video performance 521 itself.

Figure 9A:
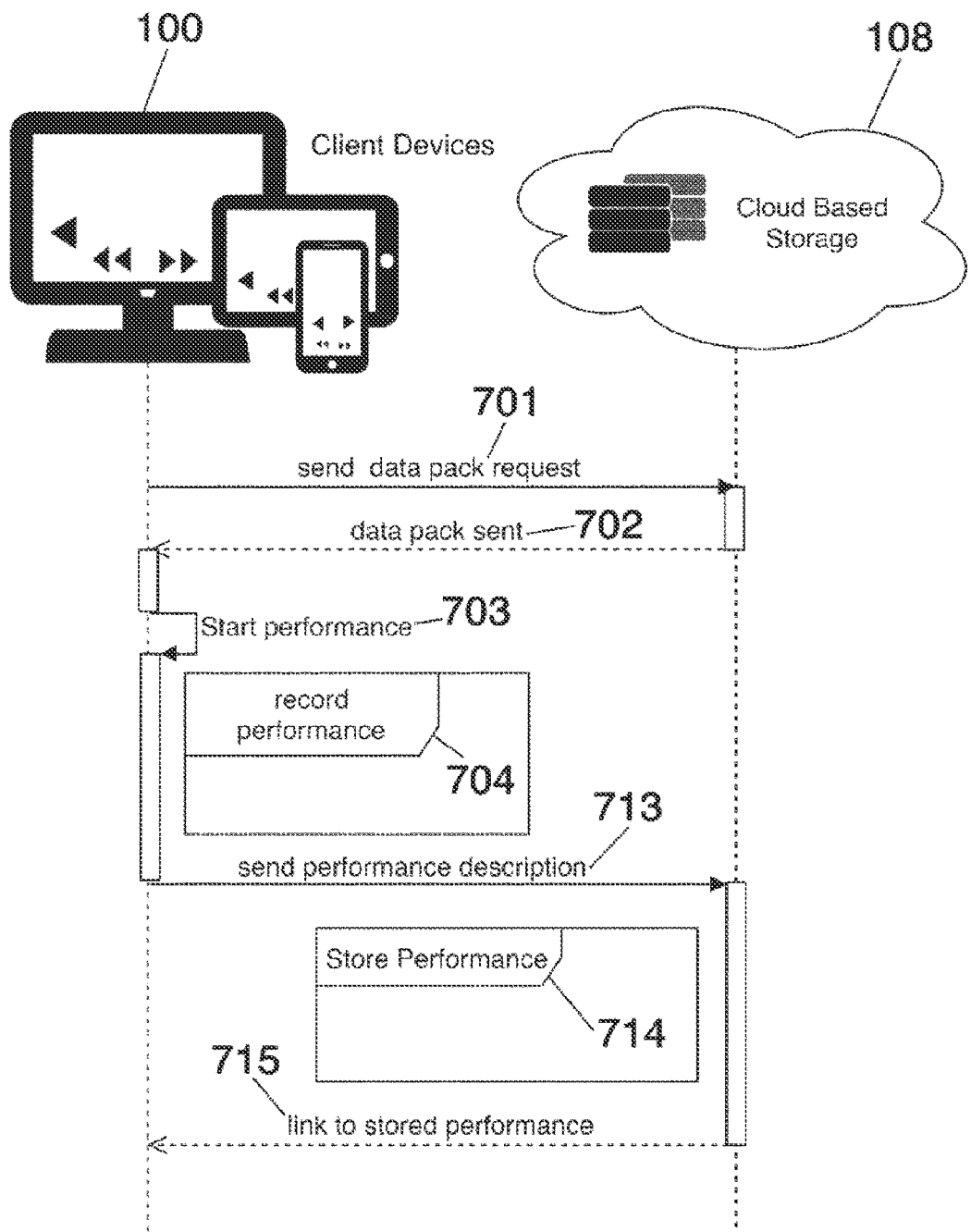
FIG. 9A is a schematic representation that depicts the sequence of data-pack exchanges among client devices and remote cloud server that allows access to the video clips resulting from the performance recorded by the user through a link, in an embodiment of the present invention.
Figure 9B:
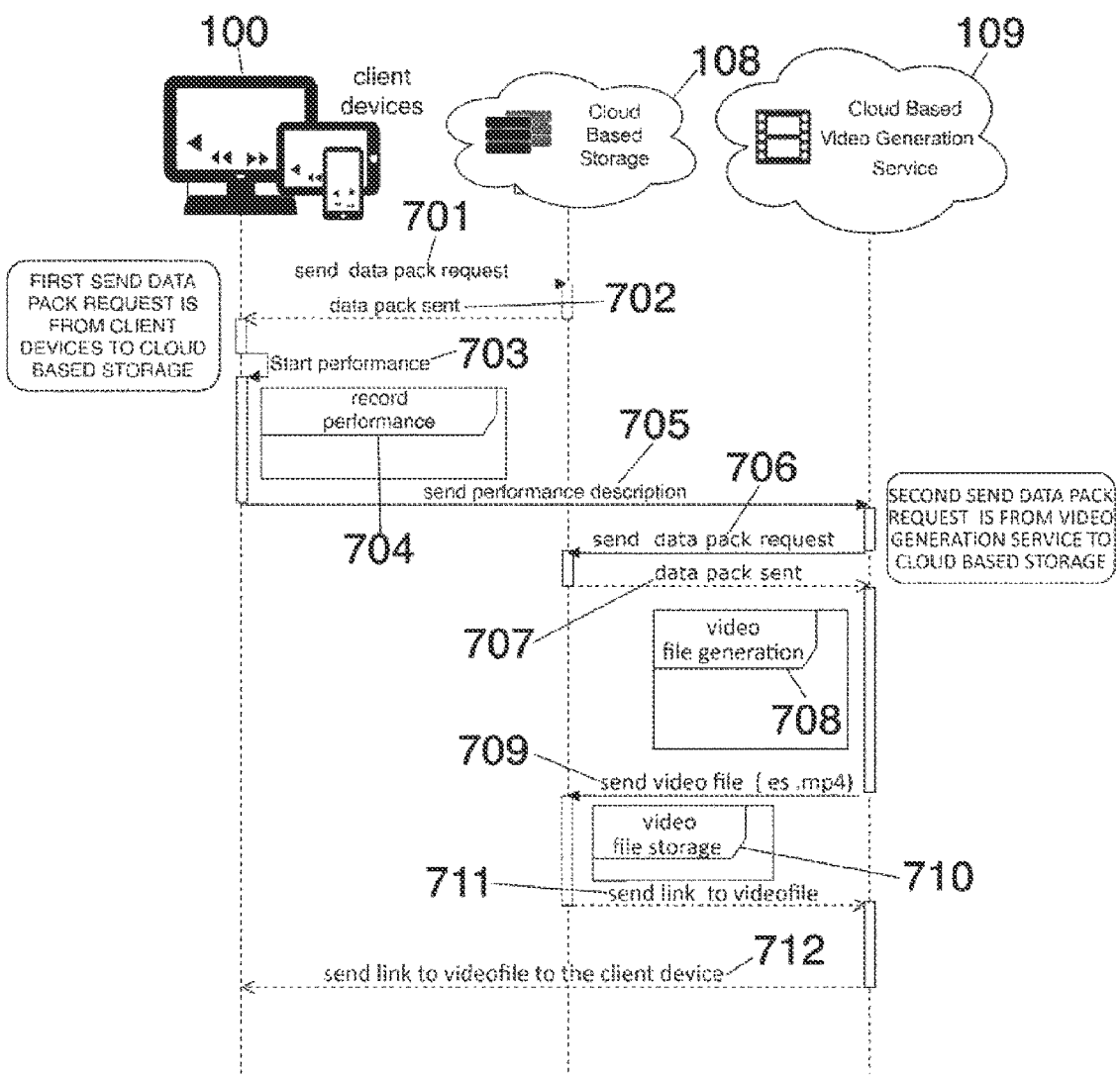
FIG. 9B is a schematic representation that depicts the sequence of data-pack exchanges among client devices and remote cloud server that allows you to remotely convert a data-pack in PBVF format to video clips in conventional formats (MPEG, AVI, etc.), in an embodiment of the present invention.
Figure 9C:
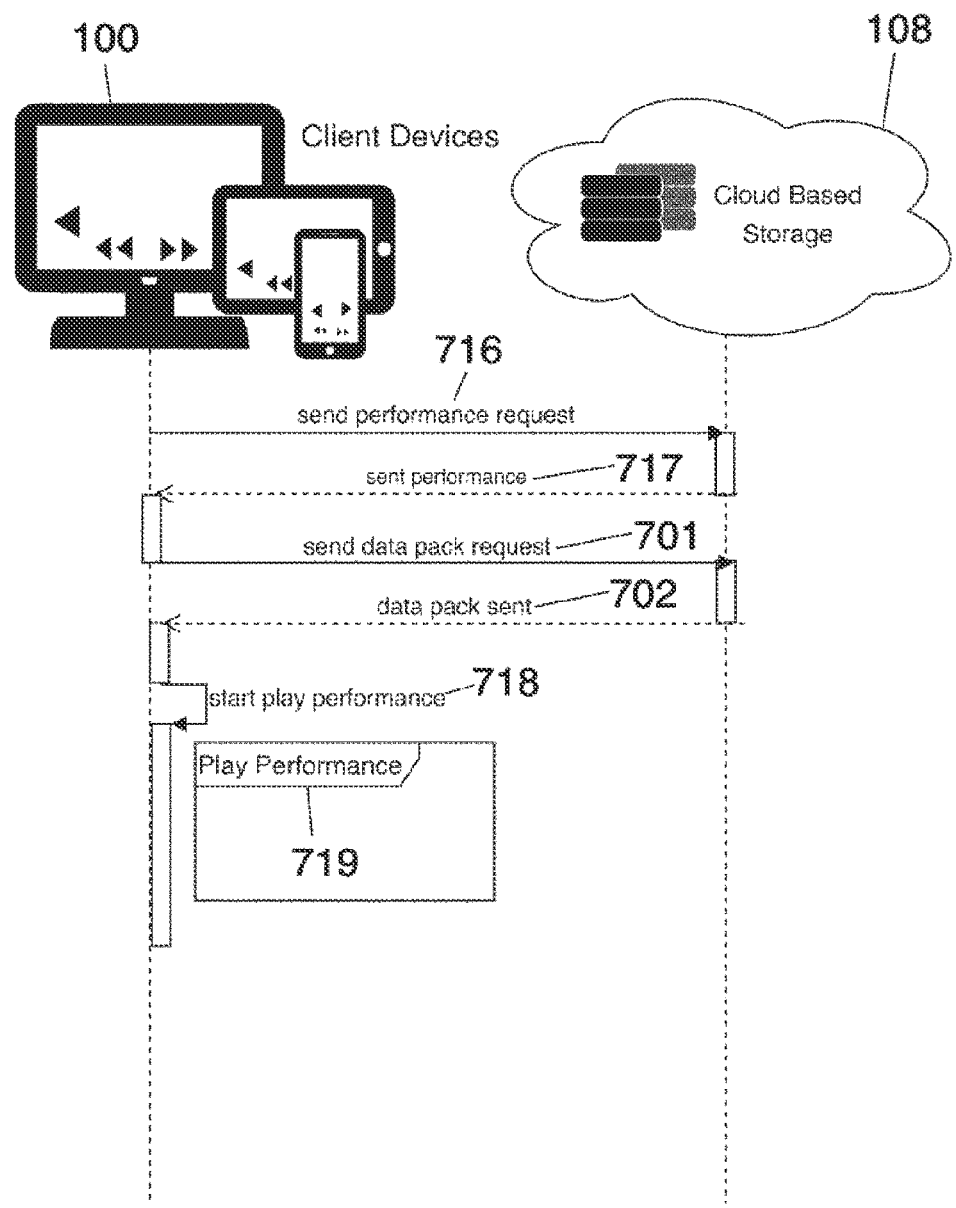
FIG. 9C is a schematic representation showing the data-pack exchanges sequence among client devices and remote cloud server relating to the reproduction of a performance 380 included in a PBVF data-pack, in an embodiment of the present invention.

This operating mode allows only the passive reproduction of a final assembled video 301, resulting from the assembling of multiple video clips 321-325 351-352 according to a performance previously defined in the data-pack which does not require any user interaction. All said video clips 321-325 and audio 330, accessible or hidden, can be managed in streaming mode, by a special processing and networking architecture represented schematically in FIGS. 9A, 9B and 9C.

Figure 3:
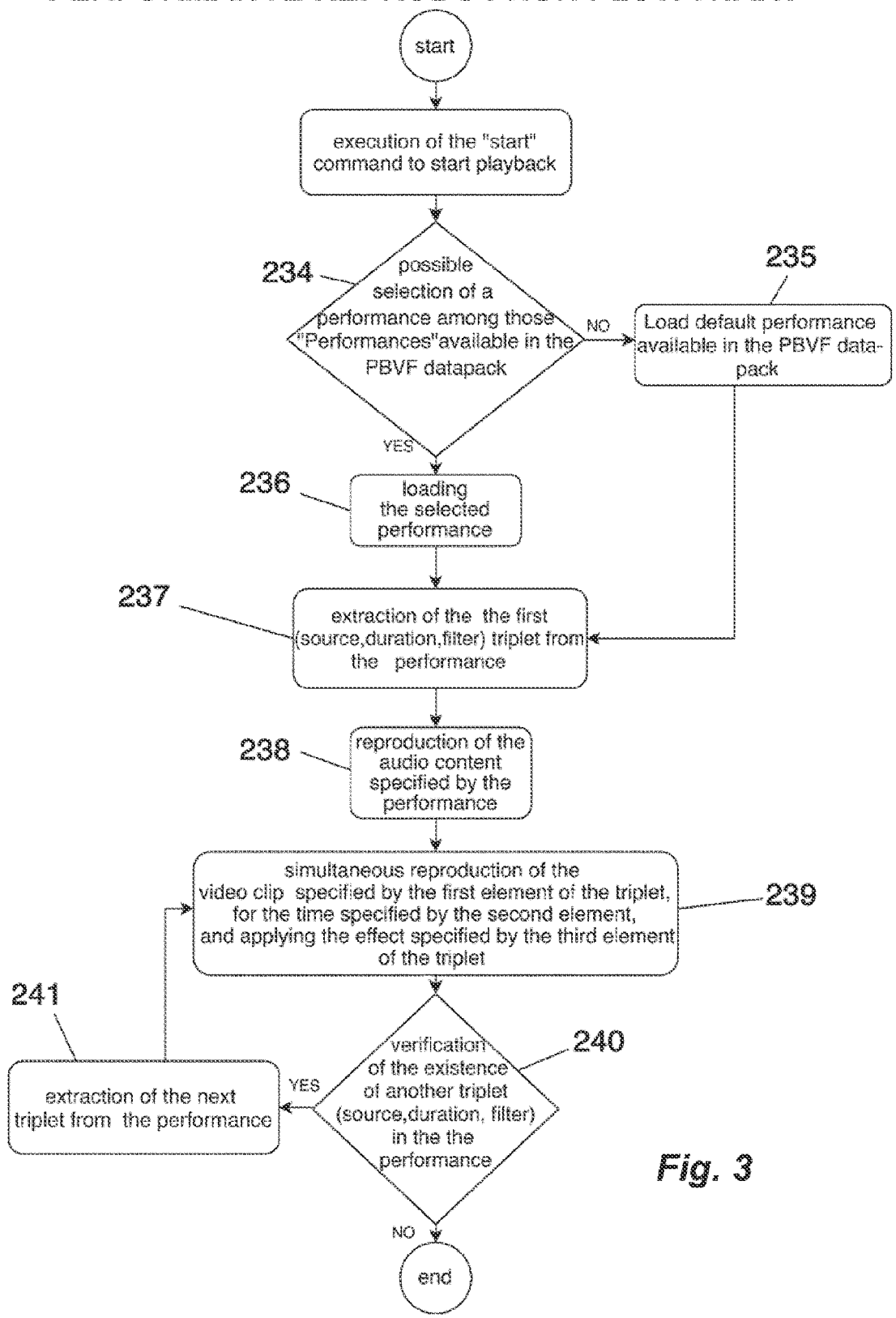
FIG. 3 is an overall flowchart showing the sequence of operations required for the "Performance Reproduction" through automatic assembling of multiple video clips 321-325, based on a pre-defined performance specified in a PBVF data-pack, in an embodiment of the instant assembling video clips method according to the present invention.

If you choose to play a video in PBVF format, the following list includes the main operating steps required by the procedure, relating to the Performance Player 112 operating mode, as shown in the schematic representation in FIG. 3:

a3) execution of the "start" command to start playback;

b3) possible selection of a performance 234 among those available in the "Performances" 380 available in the PBVF data-pack;

c3) loading the selected performance among Performances 380 available in the PBVF data-pack or, in the absence of explicit selection, loading the default performance 371 available in the PBVF data-pack;

d3) extraction of the first (source, duration, filter) triplet from the performance 237;

e3) reproduction of the audio content specified by the performance 238;

f3) simultaneous reproduction of the video clips 239 specified by the first element of the triplet, for the time specified by the second element and applying the effect specified by the third element of the triplet;

g3) verification of the existence of another triplet (source-duration-filter) in the the performance 240;

h3) extraction of the subsequent triplet 241 and return to step f3 or 239, until the end of the triplets.

Figure 5A:
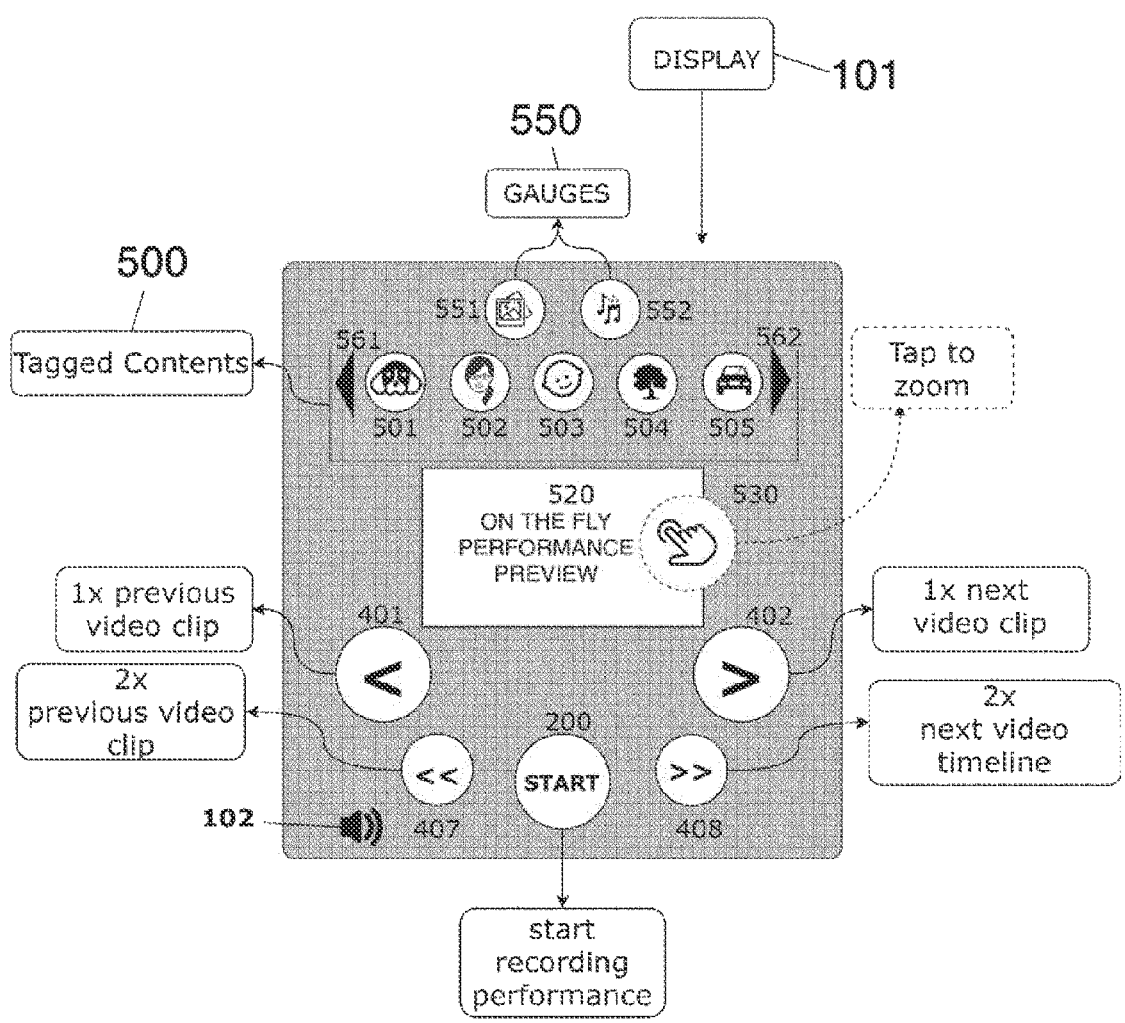
FIG. 5A is a schematic view of the performance recording natural user interface in "Basic operating configuration", in an embodiment of the instant assembling video clips method according to the present invention.
Figure 5B:
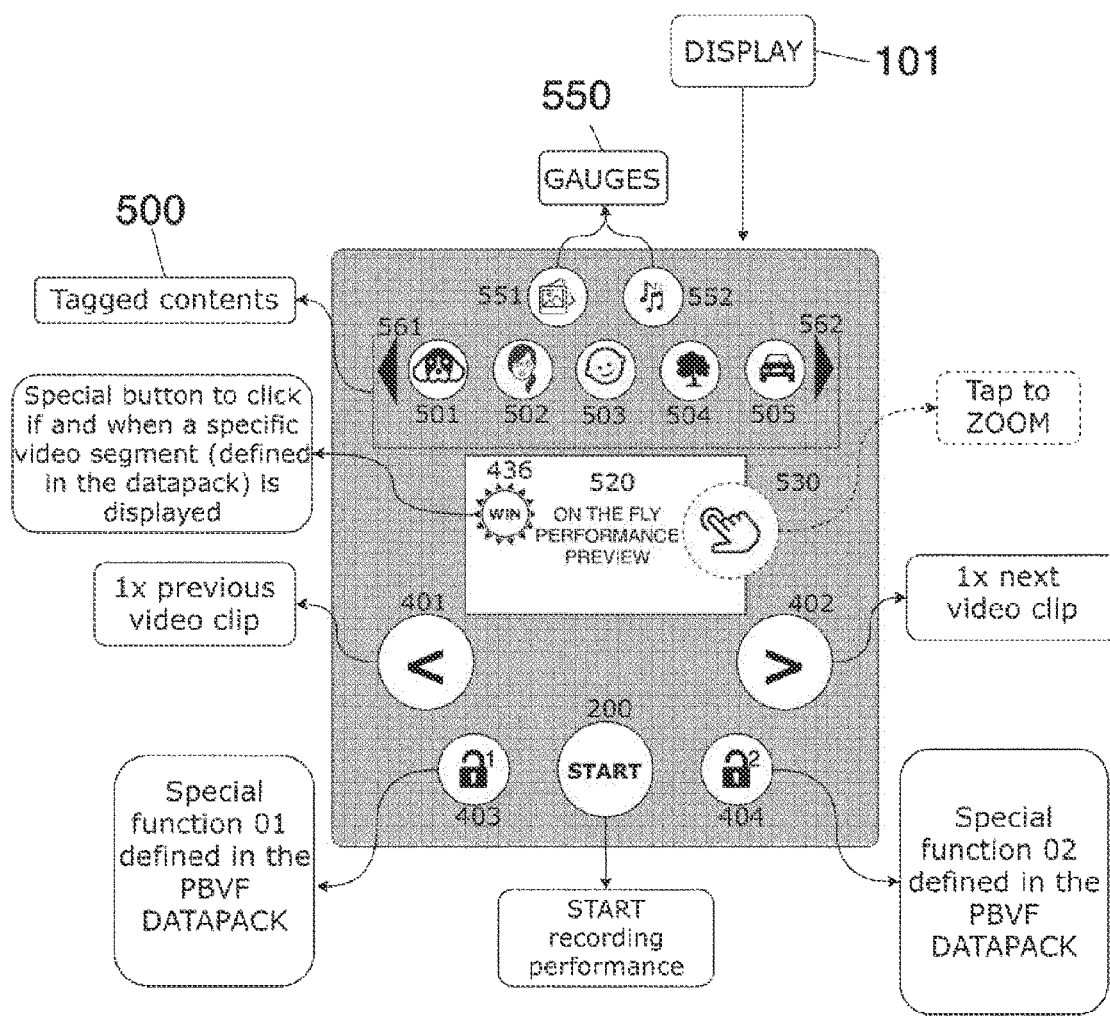
FIG. 5B is a schematic view of the performance recording natural user interface in "Reward Operating mode", in an embodiment of the instant assembling video clips method according to the present invention.
Figure 5C:
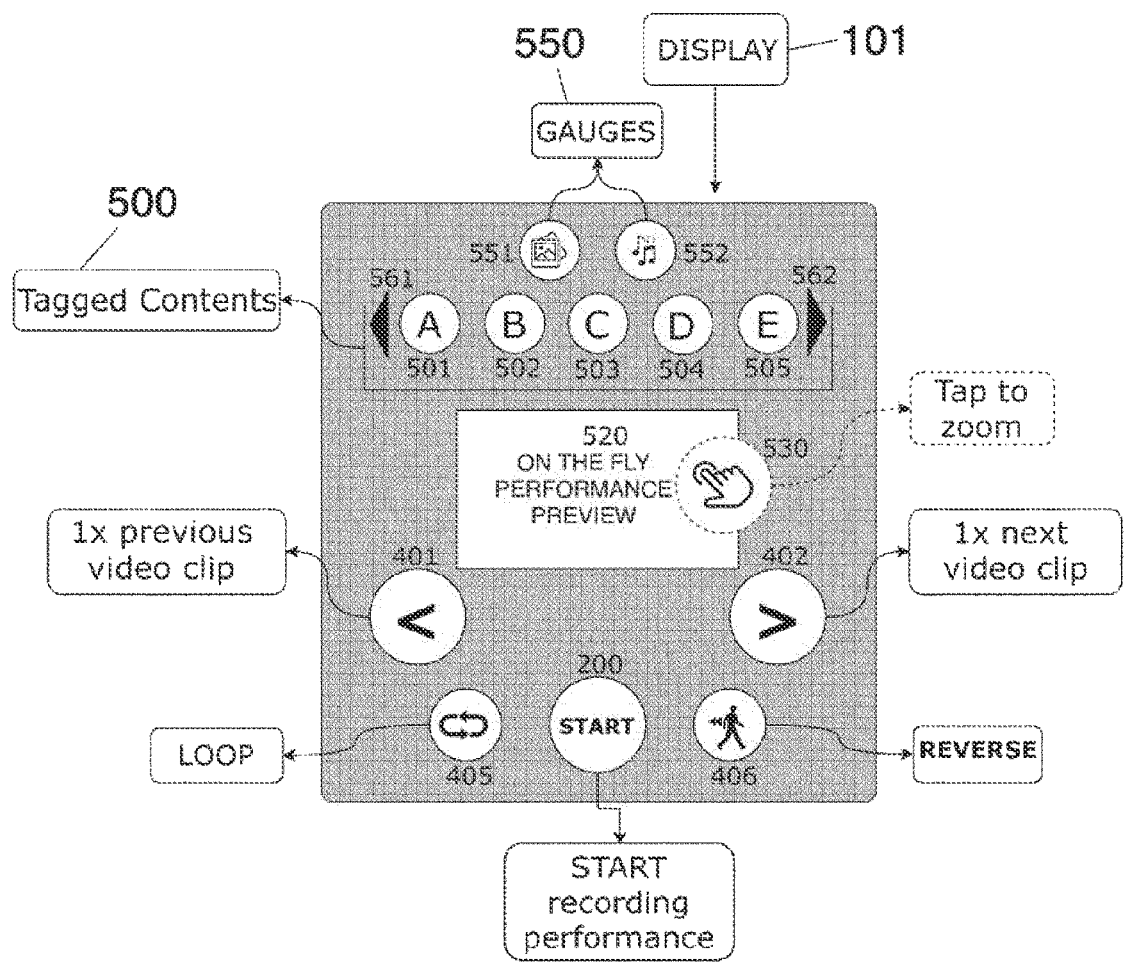
FIG. 5C is a schematic view of the natural user interface in a third operating configuration "Tail-Repeat Mode" in the performance recording mode, in an embodiment of the instant assembling video clips method according to the present invention.

The command interface shown in FIGS. 5A, 5B and 5C, relating to the Performance Recorder 113 operating mode, includes a screen or display 101, a command 200, for example with the "start" label, to start recording the video performance, a preview 520 of the same video performance, and a set of additional commands related to their respective functions.

The commands relating to the basic operating mode 401 and 402, always present in the user interface (FIGS. 5A, 5B and 5C), are configured to change the current display by instantly switching to the next video, or to the previous one, storing simultaneously with each new controls the index associated with the last video clips viewed, the duration of playback of this content and any audio/visual effects applied, such as for example a zoom 530 on a particular part of the video.

The selection of a new content to be concatenated instantly can also take place through a series of additional commands 403-408, 500-505 present in different configurations of the user interface of the aforementioned device and relating to three different types of special functions.

The commands relating to the first type of special functions 403-404 (FIG. 5B), 407-408 (FIG. 5A) are associated with hidden video clips, specified in the data-pack in PBVF format, and made accessible to the user according to reward criteria based on the real-time evaluation of the performance currently performed by the user, such as the temporal consistency between the timing of the commands interactively operated by the user and the rhythm of the audio track, or even the correspondence between the sequence of the selected clips and a reference sequence defined on the data-pack itself.

Other reward criteria may take into account previous performances or points earned by the user during activities supported by the authoring and publishing web platform 107, or the knowledge of a password provided by the creator of the data-pack enabling a cheat mode.

Another reward criterion (FIG. 6B) may consist in the visualization of a particular segment of a video clip 321-325 or a particular segment of hidden video clip 351-352 or audio segment to be searched and tapped on 436-437 during the recording performance among the available video clips. Further reward criteria may be available, or can be defined, extending the previously mentioned examples.

The commands relating to the second type of special functions 500-505, always present in the user interface (FIGS. 5A, 5B and 5C), are associated with specific segments of the video clips 321-325 previously indexed during the data-pack authoring phase through manual procedure or through an automatic method of analyzing the image, which is not the subject of the present invention and can be implemented on a plurality of both desktop and mobile processing devices.

The commands relating to the third type of special functions 405-406 (FIG. 5C) change the display order of the current video clips 321-325, with reference to the last segment displayed.

Figure 2:
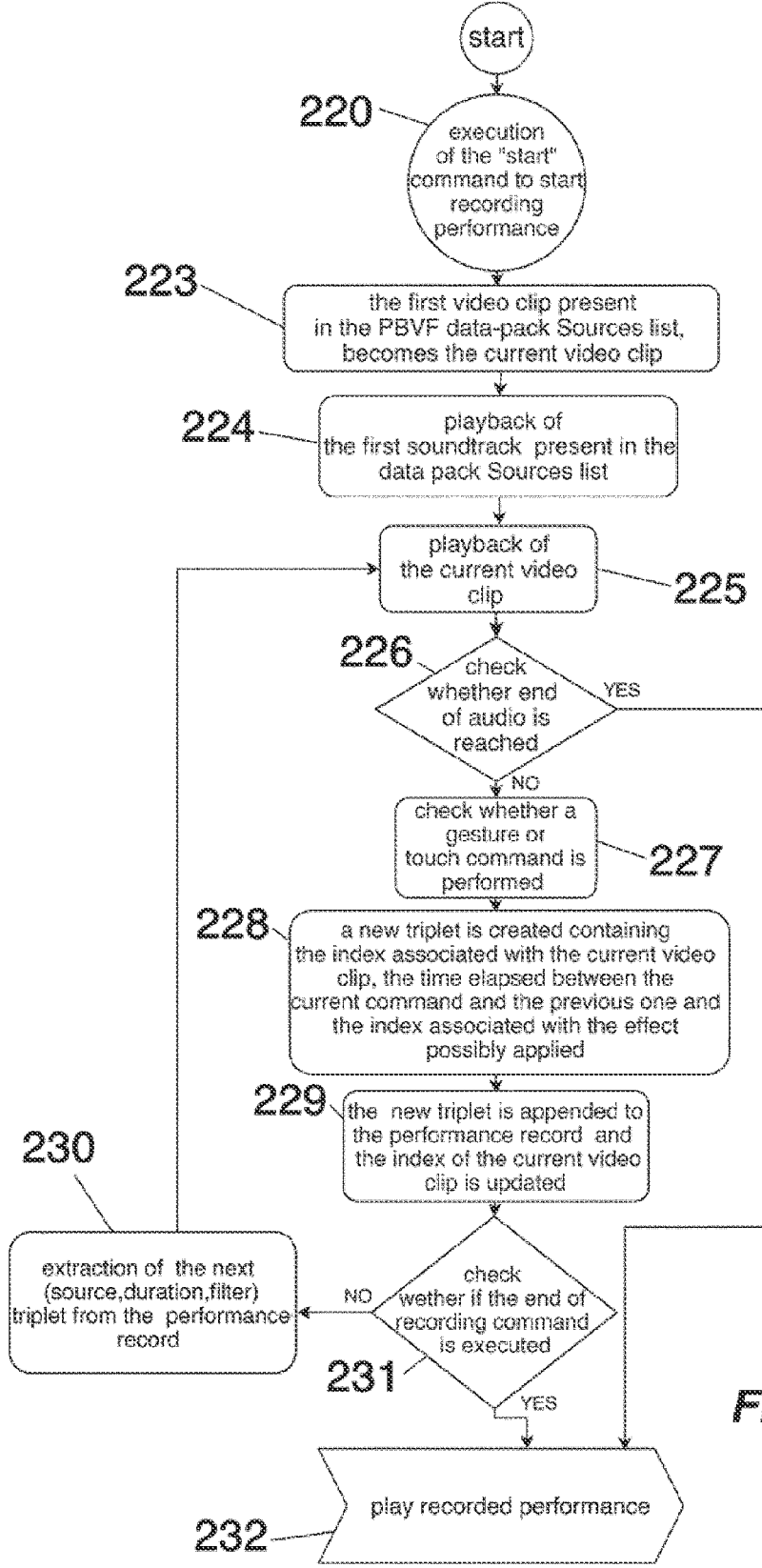
FIG. 2 is a general flowchart showing the sequence of operations required for the creation of a final assembled video through instant assembling of multiple video clips available in a PBVF data-pack, operated by the user while listening to audio content, in an embodiment of the instant assembling video clips method according to the present invention.

If one chooses to generate an original PBVF video through a user performance, the following list includes the main operating steps required by the procedure, relating to the Performance Recorder 113 operating mode, as shown in the schematic representation in FIG. 2:

a2) execution of the "start" command to start recording performance 220;

b2) the first video clips present in the list of video clips 320, specified in the PBVF data-pack, becomes the current video clips 223;

c2) playback of the audio content specified by the performance 224;

d2) playback of the current video clip 225;

e2) check whether end of audio is reached causing the immediate termination of recording, or not 226;

f2) if a gesture or touch command 227 is performed, i.e. one of the commands 401-408, 501-505 or 530, a new triplet 228 is created which contains the index associated with the current video clips, the time elapsed between the current command and the previous one and the index associated with the effect possibly applied;

g2) the new triplet is added to user performance 229, the index of the current video clips is updated based on the command executed;

h2) instead, if the end of recording 231 command is executed, the new triplet is added to the user performance which contains the index associated with the current video clips, the time elapsed between the current command and the previous one and the index associated with the any effect applied, the recording of the user performance is stopped and then the playback of the recorded performance is automatically executed 232;

i2) if no gesture or touch command is performed, the playback of the current video clips continues until the end of the same if the audio content is still playing, or it stops if the audio content ends. In the first case, the new triplet is added to the user performance which contains the index associated with the video clips just ended, its duration and the index associated with the effect possibly applied. The generation of a random index determines the new current video clips and the procedure returns to step d2 or 225.

User Interface and Related Functions

The user interface means 101 of the present invention belong to the category of natural interfaces which includes, but is not limited to, touchscreen devices, gesture recognition systems and similar with variable configuration of available functions and graphic layout, according to specific specifications in the PBVF data-pack.

These different command and control configurations enable alternative methods for the instant selection of the video clips to be assembled during the performance, which belong to four basic types of user interface means 101:

a BASIC mode, which includes the basic functions common to the general operating principle of the present invention;

a REWARD mode, which implements reward and gamification mechanisms to extend both the available audiovisual content and the video clip assembling method;

a TAG_BASED mode, which is configured for the selective insertion of previously indexed segments of said video clips 321-325 based on an off-sync assembling method;

a REPEAT mode, which is configured to repeat the final fraction of the current video clips, possibly altering the order of the frames; and an AUDIO/VIDEO PROCESSING mode, which is designed to modify in real time, through specific commands, the characteristics of the video and/or audio component of the content displayed in the preview window, including these changes in the performance being recorded.

All the configurations of the user interface means 101 have in common a set of functionalities and relative basic commands, among which the commands 200, 401, 402, 551, 552, 520, 530 which correspond to the BASIC mode. In addition to this, based on the specifications contained in the PBVF data-pack, additional commands that enable the specific functions of the other modes may be available in various combinations. All the functions relating to each of the aforementioned modes, as well as the individual commands associated with them in the user interface, are detailed below.

Basic Mode

The BASIC video clip assembling method comprises the commands 200, 401, 402, 551, 552, 520 of the user interface means 101, shown in FIGS. 5A, 5B and 5C.

Figure 6A:
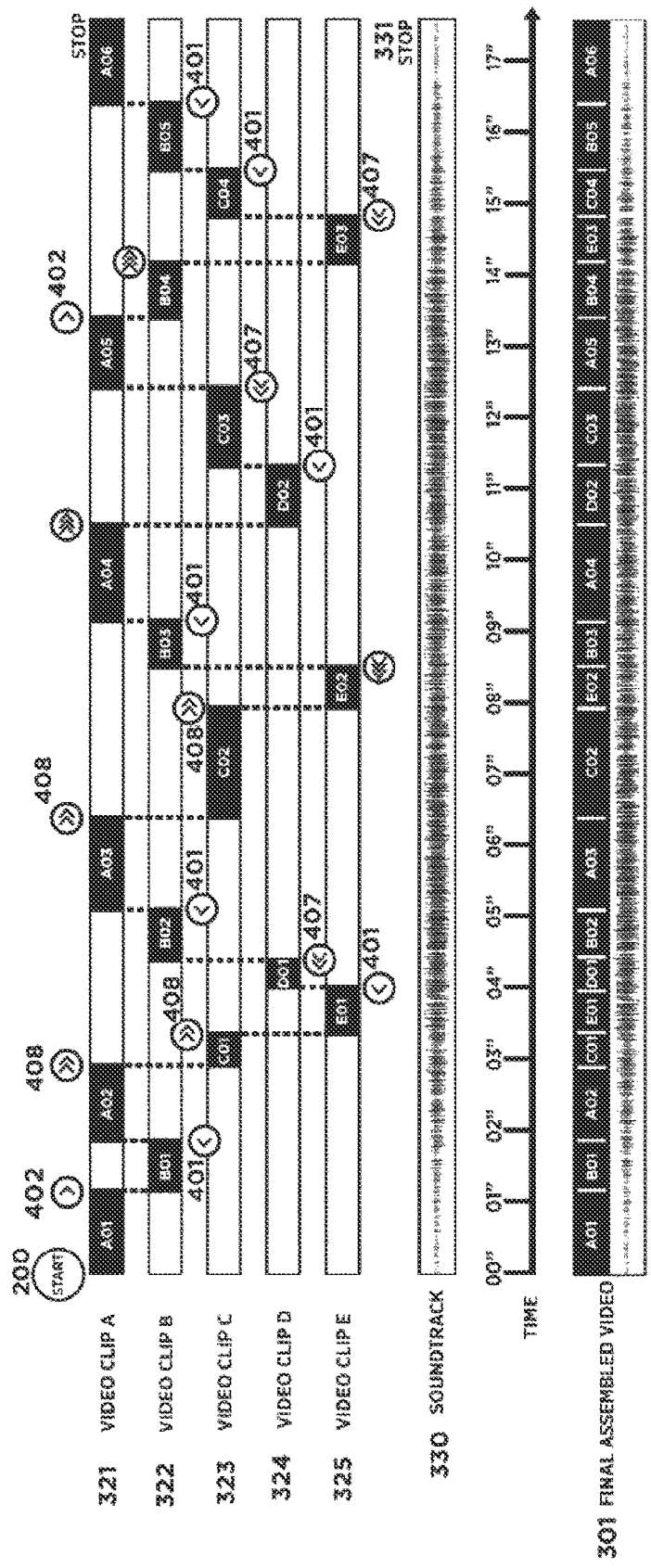
FIG. 6A is a schematic representation of the "BASIC" video clips assembling method, according to which the user interactively selects which of the available video clips has to be appended to the current one, through basic next-clip/previous-clip commands, in an embodiment of the present invention.

START/STOP 200: start/end playback or recording;

PREVIOUS 401: passage from current frame i of the current video clips j to frame i+1 of the video clips j−1 in the list of available video clips 320 (FIG. 6A), where if j=1 then j−1=(last_video_in_the_list);

NEXT 402: passage from the current frame i of the current video clips j to frame i+1 of the video clips j+1 in the list of available video clips 320 (FIG. 6A), where if j=(last video in the list) then j+1=1;

VIDEO_LEFT 551: graphic/numeric indicator of the remaining duration of the current video clips;

AUDIO_LEFT 552: graphic/numerical indicator of the remaining duration of the audio content;

PREVIEW 520: preview of the ongoing performance.

Reward Mode

Figure 6B:
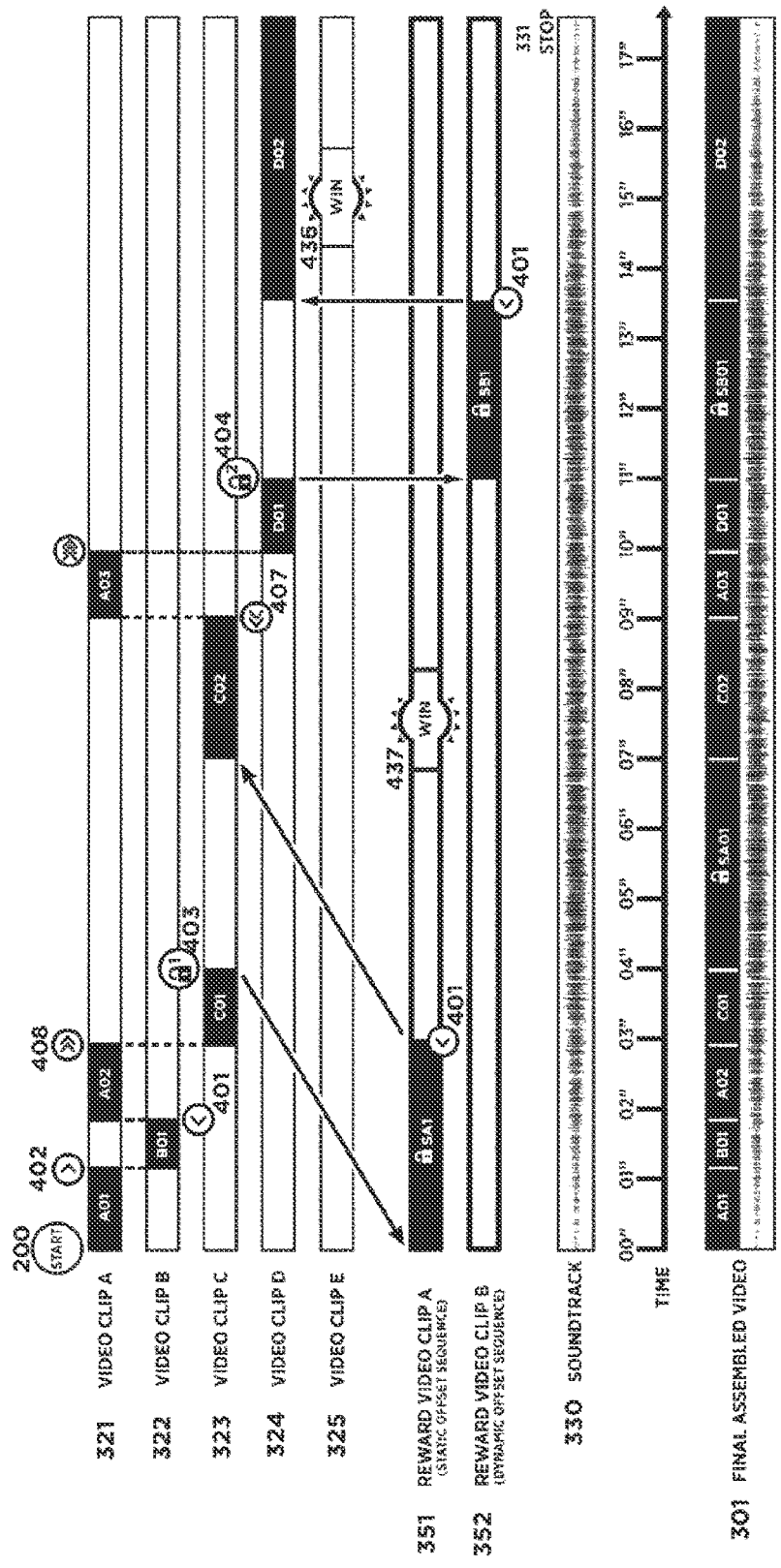
FIG. 6B is a schematic view of the REWARD_BASED video clips assembling method, operating on hidden video clips unlocked according to real-time evaluation of user interaction, in an embodiment of the present invention.

The REWARD operating mode comprises the commands 403, 404, 407, 408, 436-437 of the user interface means 101, illustrated in FIGS. 5A, 5B and 6B.

REWARD_Type_1 403: availability based on automatic evaluation criteria of the ongoing user performance, such as, for example, the temporal consistency between the timing of the commands changing the current visualization and the rhythm of the audio track, or the correspondence between the sequence of video clips assembled by the user and a reference sequence defined in the data-pack; jump from the current frame i of the current video clips j to frame 1 of the hidden video clips k in the list of available hidden videos (operation exemplified in FIG. 6B, ref. SA1), therefore k=k+1 if (k+1)<=(number of hidden videos available) otherwise k=(first hidden video in the list);

REWARD_Type_2 404: availability based on automatic evaluation criteria of the ongoing user performance, such as, for example, the temporal consistency between the timing of the commands changing the current visualization and the rhythm of the audio track, or the correspondence between the sequence of video clips assembled by the user and a reference sequence defined in the data-pack; jump from the current frame i of the current video clips j to frame j+1 of the hidden video clips k in the list of available hidden videos (operation exemplified in FIG. 6B, ref. SB1), therefore k=k+1 if (k+1)<=(number of hidden videos available) otherwise =(first hidden video in the list);

REWARD_Type_3: availability based on the user ability of spotting and selecting an iconic-image 436-437, possibly overlaid onto the current video clip; causes a reward to be won. Two criteria for iconic-image 436-437 display are provided. First criterion: display of the iconic-image within the current video-clip is solely randomic, only requiring the current video clip not being the first one visualized. Second criterion: display of the iconic-image happens whenever the user reaches a particular time location in a particular video clip both specified in the PBVF data-pack.

PREVIOUS_N 407: jump from the current frame i of the current video clips j to frame i+1 of the video clips j-N (with N<video number in the list) in the list of available video clip 320 (operation exemplified in FIG. 6A), where if (j-N)<1 then (j-N)=(last video in the list);

NEXT_N 408: jump from the current frame i of the current video clips j to frame i+1 of the video clips j+N (with N<number_video_available) in the list of available video clips 320 (FIG. 6A), where if (j+N)>(number_video_available) then j+N=1.

Tag_Based Mode

The TAG_BASED operating mode based on an off-sync assembling method, enables the insertion of pre-indexed segments of video clips selected according to their content, within the basic video clips assembling flow of the pre-synchronized video clips.

The TAG_BASED operating mode includes the commands 501, 502, 503, 504, 505 (in short, 50X where X=1,2,3,4,5) of the user interface means 101, illustrated in FIGS. 5A, 5B and 5C.

Figure 6C:
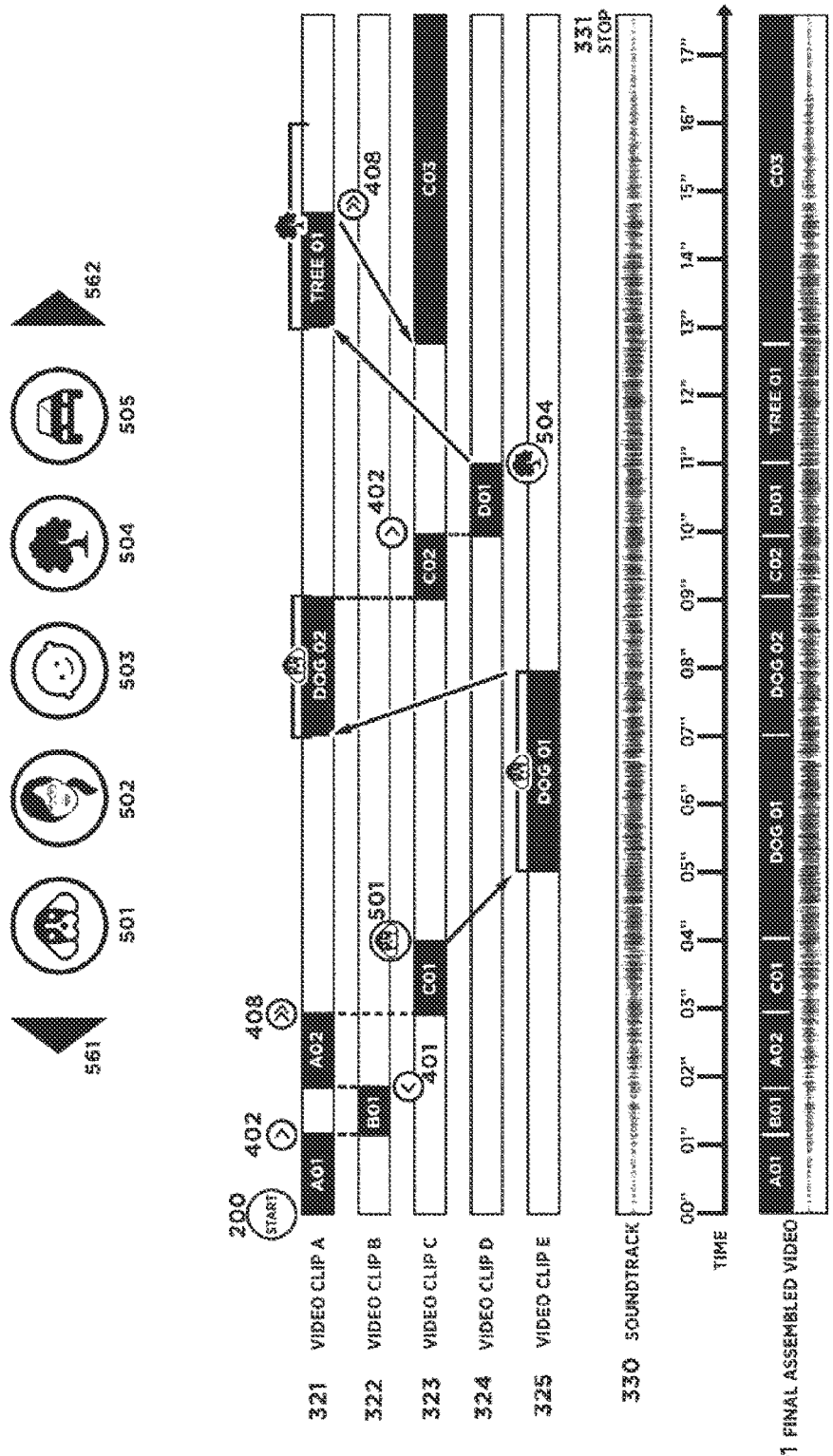
FIG. 6C is a schematic view of the TAG_BASED video clips assembling method operating on segments of video clips 500 defined through a previous indexing and tagging operation, in an embodiment of the present invention.

GOTO_TAG_X 50X: jump from the current frame i of the current video clips j to frame 1 of the first video excerpt associated with the 50X command (operation exemplified in FIG. 6C) and related explanatory icon. The video excerpts, previously indexed either through manual annotation techniques or through automatic logic of visual content analysis, are univocally defined by a video clip_index, a segment_start index, a segment_end index and an icon exemplifying the content displayed on the interface, where all these data are specified in the PBVF data-pack. In the case of multiple video excerpts available for the same command 50X and related explanatory icon, each time the command 50X is operated through the same content icon, this action triggers the passage from the current frame i of the current video clips j to the frame 1 of the next available video segment associated to that icon. Whenever all the video excerpts related to the same content icon have already been displayed, the next available video excerpt will be the first in the list specified in the PVFB data-pack. If the video excerpt corresponding to the 50X command has ended, but not the main audio track, the visualization of the previous video clips is resumed from current frame i+1+(excerpt_duration in frames) corresponding to the time elapsed during the execution of the 50X command, thus preserving the audio-visual synchronization.

Tail_Repeat Mode

The TAIL_REPEAT operating mode appends a tail portion of the current video clip, to the video clip itself.

The mode called TAIL_REPEAT comprises the controls 405 and 406 of the user interface means 101, illustrated in FIG. 5C.

Figure 6D:
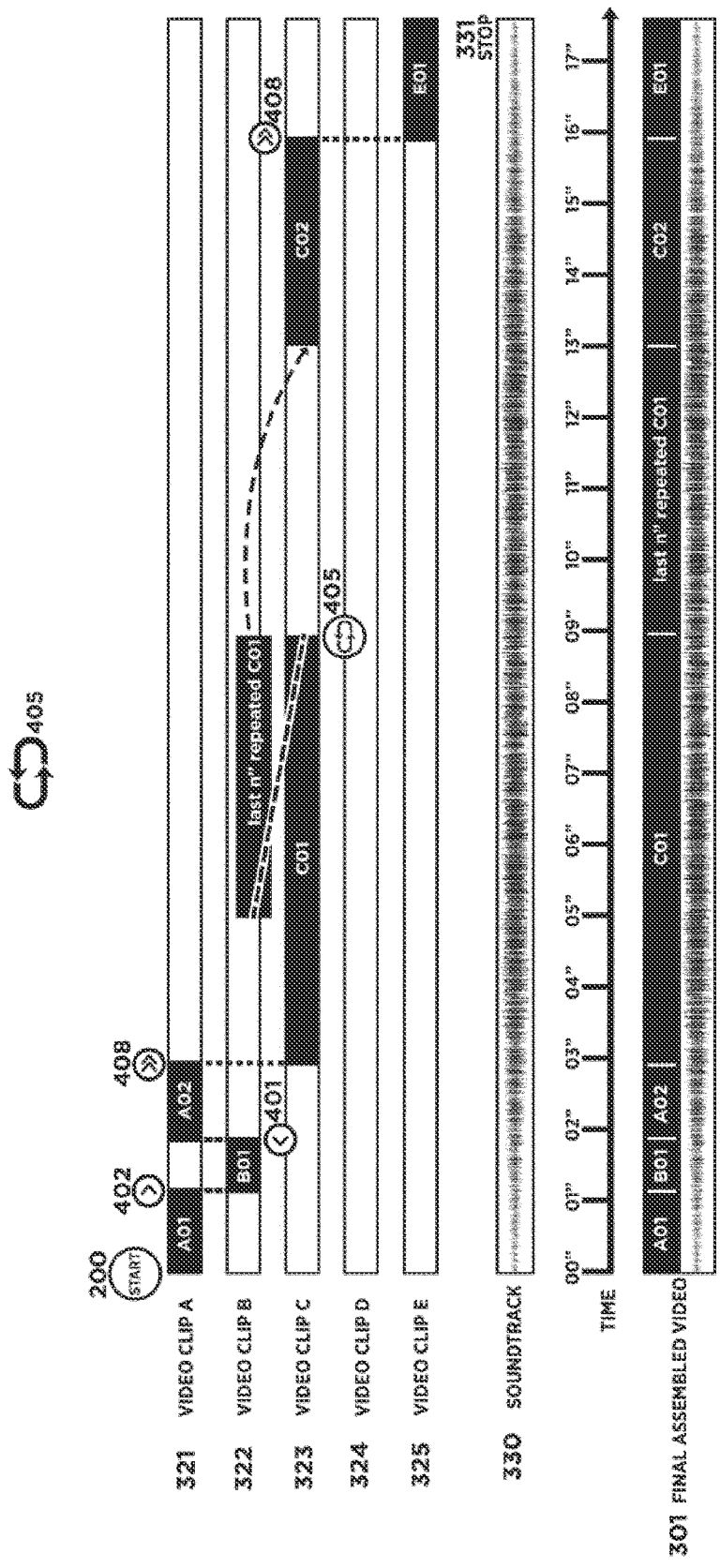
FIG. 6D is a schematic view of a TAIL-REPEAT(LOOP) mode video clip assembling method, according to which the last n seconds of the displayed video clip are appended to the same video clip, in an embodiment of the present invention.
Figure 6E:
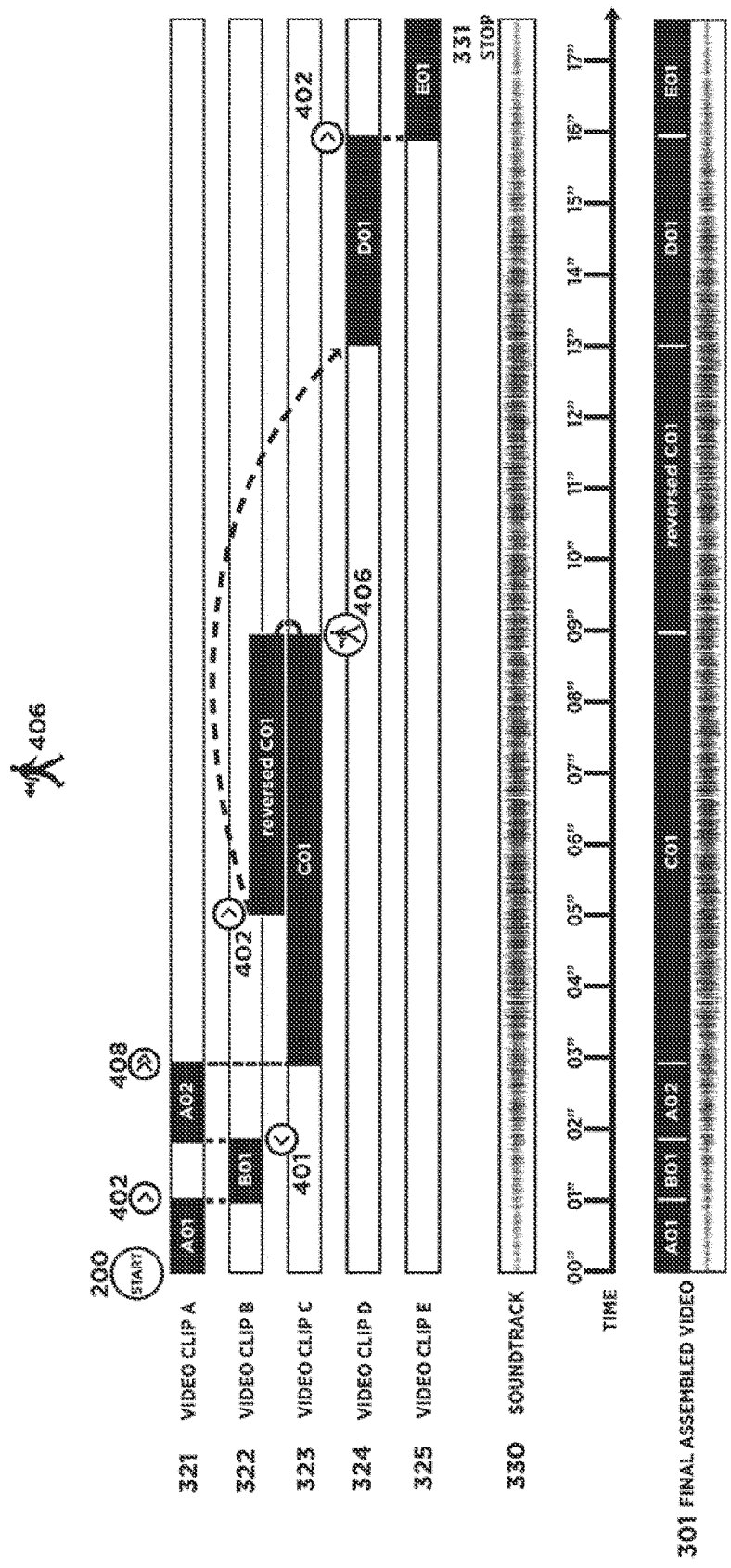
FIG. 6E is a schematic view of a REVERSE video clip assembling method, according to which the frames of current video clip are appended in reverse order to the same video clip, in an embodiment of the present invention.

LOOP 405: jump from current frame i of the current video clips j to frame i−(n×video_clip_frame_rate) repeating the last n seconds of the current video clips (operation exemplified in FIG. 6D), wherein the parameter "n" is specified by the PBVF data-pack;

REVERSE 406: appends the last n seconds of current video clips j to current frame i in reverse order (operation exemplified in FIG. 6E), then resuming the reproduction of current video clips j in the correct order from frame i+1; where the parameter "n" is specified by the PBVF data-pack. Optionally the Reverse command can be configured to append to current frame i of current video clip j each of the previous frames in video clip j in reverse order, until either another command is operated, or the achievement of the first frame resumes the reproduction of video clip j from frame i+1.

Audio/Video Processing Mode

The AUDIO/VIDEO PROCESSING mode comprises the command 530 of the user interface means 101, illustrated in FIGS. 5A, 5B and 5C.

CLOSE-UP or ZOOM 530—a crop-zoom of the current video clips is performed, compatibly with the constraints of the video format, based on the screen coordinates (x, y) of the point selected by the user. These coordinates become the geometric center of a rectangular region with the same aspect ratio as the current video clips but with a side size equal to 50% of the same. This region is enlarged by interpolation by replacing the total image with a detail. In the event that, based on the point selected, the rectangular region to be enlarged was partially outside the frame, it will be translated in the appropriate direction to make it fall within the limits of the same frame.

PBVF Data-Pack and PBVF Multimedia Format

The PBVF (Performance Based Video Format) multimedia format, as also mentioned part of the present invention, is a data structure capable of specifying a set of information required for the operation of the present invention.

This information is represented, in the PBVF format, through an ordered list that can include a variety of data types, including:

1) an ordered list of both dynamic and static video clips 321-325, referred as Sources 320, in a variety of encoding and streaming formats, such as mp4, avi, wmv, mms, rtsp, hls, m3u8, jpg, bmp, png, etc. (mandatory data);

2) an audio track 330, called Audio, in a variety of formats, such as mp3, wma, wav, etc. (optional data);

3) a preview image file, called Cover, in a variety of formats such as, for example, jpg, bmp, png, gif, animated gif, etc. (optional data);

4) a default performance, called Default Performance (optional data);

5) a set of other performances other than the default, called Performances (optional data);

6) an ordered list of video clips segments (340) extracted starting from video clips (321-325) and hidden video clips (351-352), the former viewable in association with the 501-505 commands and latter based on reward and/or gamification mechanisms (optional data);

7) a set of graphic, numeric and touch controls, called UI Layout, possibly present to modify and/or expand the basic functions (optional data).

Below is an example table of the ordered list of the PBVF multimedia format, which as mentioned is part of the present invention.

| | |
|---|---|
| Performance elements: sequenceOf: | (301) |
| {sourceIndex, duration, filter} | |
| {1, 10, steel} | |
| {2, 12, zoomIn} | |
| {5, 8, tilt} | |
| ... | |
| PBVF MULTIMEDIA FORMAT | (310) |
| Sources: sequenceOf: video or photo files - mandatory | (320) |
| video_sequence_A.mp4, offset | (321) |
| video_sequence_B.mp4, offset | (322) |
| video_still_images_A.jpg, offset | (323) |
| hidden_video_A | (351) |
| hidden video B | (352) |
| ... | |
| Audio: audio file (mp3, avc, ogg, wma, etc.) - optional | (330) |
| audio.mp3, offset | (331) |
| ... | |
| Preselected segments for keys 501-505 (TAG_BASED): video or photo files - optional | (340) |
| video_sequence DOG.mp4 | (341) |
| video_sequence_TREE.mp4 | (342) |
| photo 03.jpg | (343) |
| Additional information:- Optional | (350) |
| icon image to associate with gesture or touch controls, | |
| index relating to the set of pre-selected segments, | |
| minimum score threshold, | |
| unlock password, | |
| frame to locate for unlock | |
| Cover: jpeg or jpg file - optional | (360) |
| cover.jpg | (361) |
| ... | |
| Default Performance: Performance - optional | (370) |
| defaultPerformance | (371) |
| ... | |
| Performances: sequenceOf: Performance optional | (380) |
| performance1 | (381) |
| performance2 | (382) |
| ... | |
| Filters and effects: | (390) |
| steel | (391) |
| zoomIn | (392) |
| zoomOut | (393) |
| tilt | (394) |
| blur | (395) |
| overexpose | (396) |
| underexpose | (397) |
| overlay images | |
| overlay videos | |
| ... | |

Below is a formal definition of the ordered list of the PBVF multimedia format, which as mentioned is part of the present invention.

```
PBVFFormat ::= SET {
  sources              SEQUENCE OF Source,
  audio OPTIONAL Audio,
  cover OPTIONAL Content,
  performances OPTIONAL SEQUENCE OF Performance,
  defaultPerformance OPTIONAL INTEGER,
  videoSegments OPTIONAL SEQUENCE OF VideoSegment,
  specialKeys OPTIONAL SEQUENCE OF SpecialKey
}
Source ::= SEQUENCE {
  sourceType SourceType,
  content              Content,
  offset OPTIONAL INTEGER
}
SourceType :: ENUMERATED {
  jpg                  (0),
  png                  (2),
  gif                  (3),
  mp4                  (4),
  avi                  (5),
  m3u8                 (6),
  ts                   (7)
}
Audio ::= SEQUENCE {
  content              Content
  offset OPTIONAL INTEGER
}
Content ::= CHOICE {
  local OCTET STRING,
  remote               IA5String
}
Performance ::= SEQUENCE {
  sourceIndex INTEGER,
  duration             INTEGER,
  filter               OPTIONAL Filter
}
Filter ::= ENUMERATED {
  steel                (0),
  zoomIn               (1),
  zoomOut              (2),
  tilt                 (3),
  blur                 (4),
  overexpose           (5),
  underexpose          (6)
}
VideoSegment ::= SEQUENCE {
  Tag                  UTF8String,
  sourceSource,
  start OPTIONAL INTEGER,
  end OPTIONAL INTEGER
}
SpecialKey ::= SEQUENCE {
  icon                 Content
  index INTEGER
  threshold            INTEGER
}
```

As part of this PBVF format, "Performance" is defined as an ordered list (sequenceOf) of triplets, in which:
the first element called "sourceIndex" is an integer that represents an index within the "Sources" set;
the second element called "duration" is a time duration expressed in milliseconds;
the third element called "effect" encodes an immediate processing effect of the video clips such as, for example, Close_Up, Tilt, Blur, Null, Over_Expose, Under_Expose, etc.

A PBVF data-pack constitutes a single instance of the data structure defined by the format itself, which can be used both as a basis from which to record a new original performance, and as a formal descriptor of the characteristics of an audiovisual content, to be reproduced passively. As such, a PBVF data-pack can be created by third parties through an authoring process on the web platform, or be produced locally on the device 100 according to the invention, through this system and method as described in the following section.

Local Authoring of PBVF Data-Packs

Figure 7A:
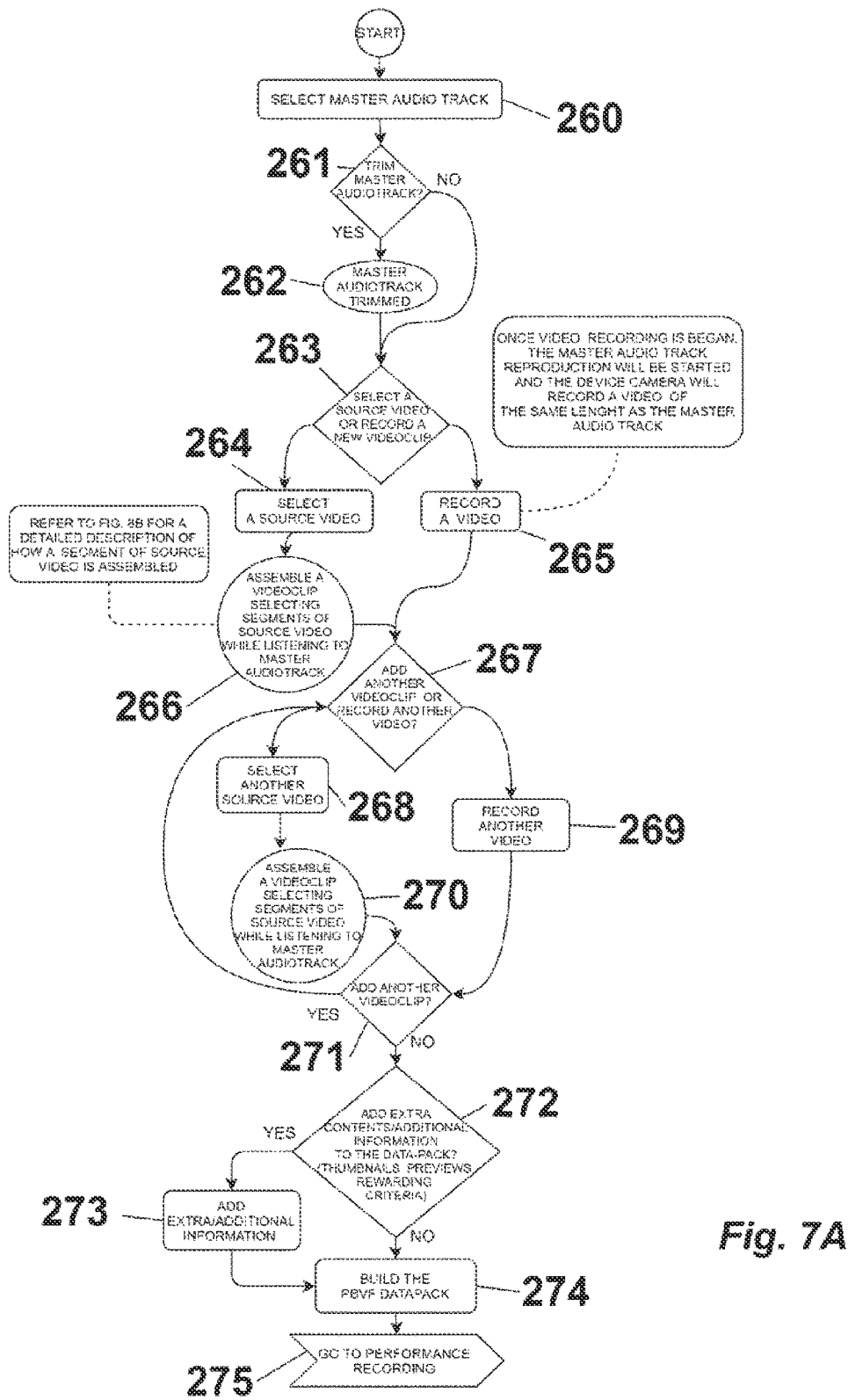
FIG. 7A is an overall flowchart showing the sequence of operations required for Local data-pack authoring procedure.

The local authoring software component Data-pack Creator 110 of the present invention is configured for the creation, directly on the device 100, of data-packs compliant with the PBVF format, starting from a list of a source videos and audio track available locally and through an original procedure which includes the following steps, illustrated in FIG. 7A:

selection 260 and possible trimming 261, 262 of the main audio track (master-audio-track), whose duration also defines the duration of the video clips to be added to the data-pack;

selection and addition 264, 265, 266, 267, 268, 269, 270, 271 of a new video clip 321-325 in the PBVF data-pack, an operation that can be repeated as desired. The extraction of segments from source video 266 to assemble a new video clip is based on an original assembling method based on the procedure schematically illustrated in FIG. 7B. This method, starting from a video non yet inserted in the data-pack or after one has recorded with camera device a video, makes it possible to assemble a new video clip, whose duration corresponds to that of the master audiotrack, to be included in the Sources 320 video clips list of the data-pack;

selection and addition 272, 273 of optional elements such as Cover, Preview, etc., which can possibly enrich the data-pack;

encapsulation in a PBVF data-pack and encoding in the PBVF format 274, which allow the data-pack to be used for the creation through performance (FIG. 2) of new original audiovisual content 301, starting from said video clips 321-325 specified in the data-pack 320.

The data-packs thus obtained can be enabled for the reproduction of default Performance 380, or for the recording of new unique performance starting from the video clips 321-325 added with this PBVF data-pack authoring procedure.

Figure 7B:
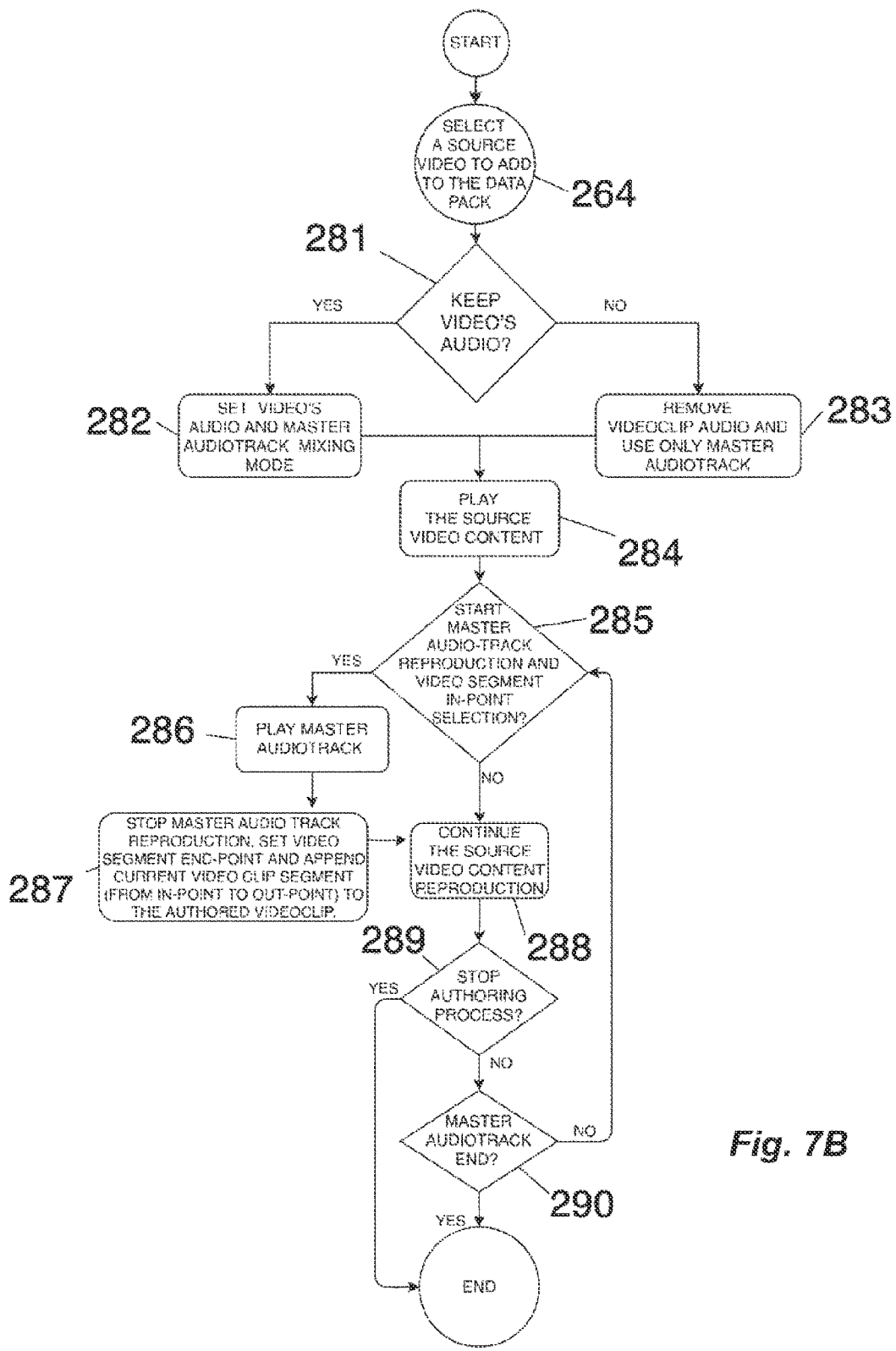
FIG. 7B is an overall flowchart showing the sequence of operations required for selecting segments of source videos 802 to assemble a video clip in the local data-pack authoring procedure, in an embodiment of the present invention.
Figure 8:
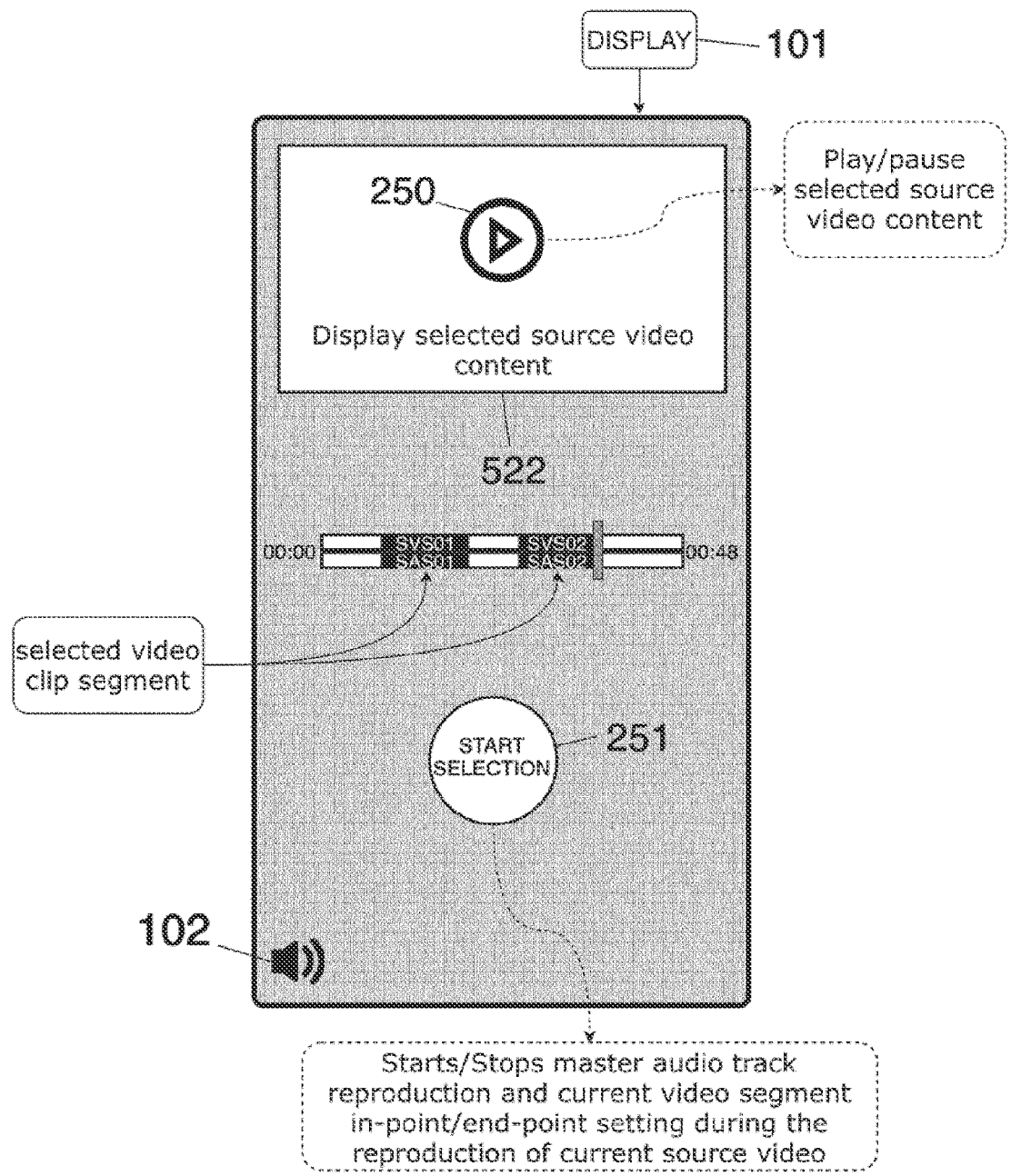
FIG. 8 depicts a schematic representation of the graphic user interface of source video segments assembling process within the local data-pack authoring procedure, in an embodiment of the present invention.

FIG. 8 illustrates a schematic representation of a possible control interface in the assembling phase (also shown in FIG. 7B) of segments of a sourcevideo during the local authoring of a PBVF data-pack, comprising a screen or display 101, a command 250 to start playback of a selected source video, a command 251, for example with the "start selection" label, to Start/Stop master audio track reproduction 801 and current video segment in-point/end-point setting during the reproduction of current source video.

Figure 7C:
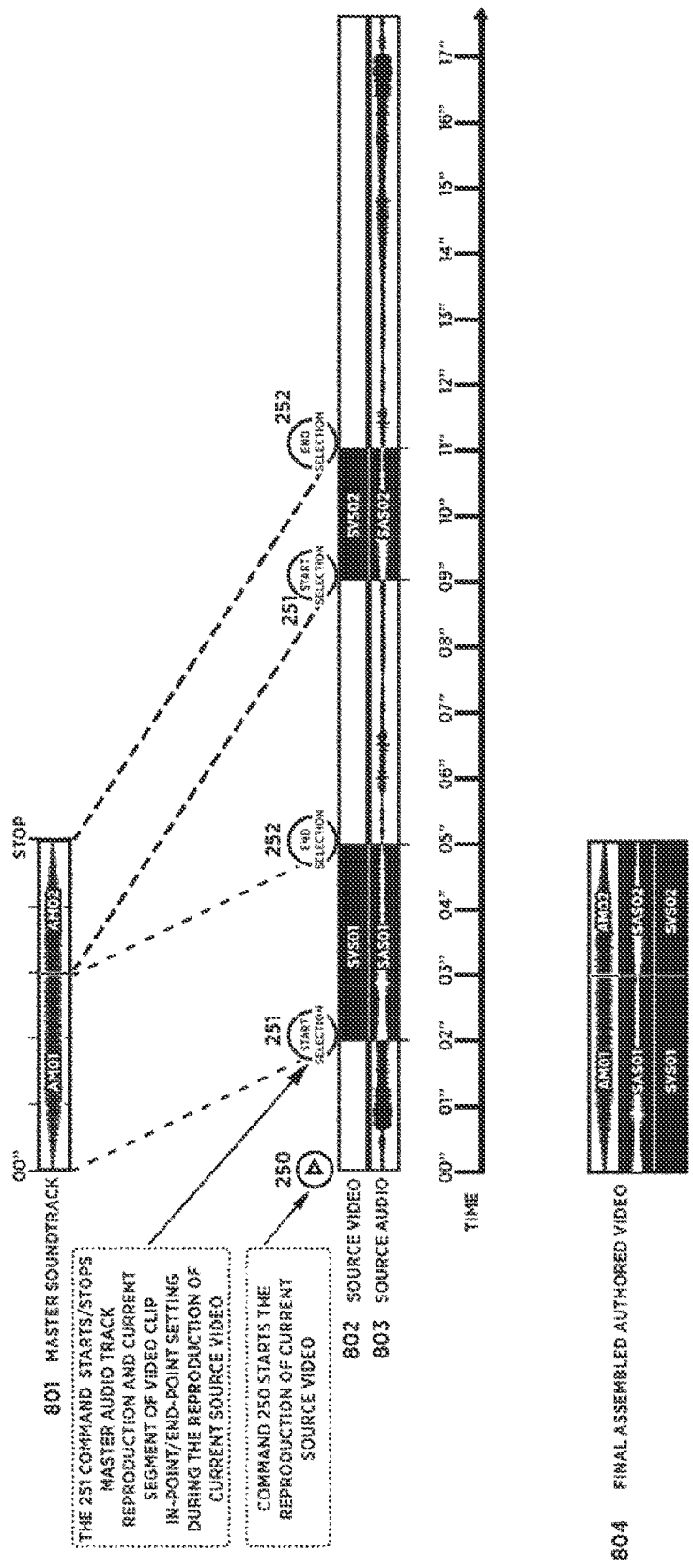
FIG. 7C is a schematic view of source video segments assembling method within a data-pack local authoring procedure, in an embodiment of the present invention.

As mentioned above, the selection and addition of new video clips to be added to the PBVF data-pack is based on an original procedure which includes the following steps, illustrated in FIG. 7B:

the user starts the source video reproduction 264, 284 through a gestural or touch interface command;

as soon as you press another gesture or touch command, reproduction of the master-audio-track 285, 286 begins and continues as long as the command is pressed and it starts the in-point selection of the segment of video to append in the resulting video;

by releasing button Start/Stop 251 the master audio track reproduction is stopped and the segment video end-point is set. The segment of the source video between the in-point and end-point becomes the first segment of the new video clips to be inserted 287 in the PBVF data-pack while the continues the source video 288 reproduction, if this has not come to an end;

using the same command 251 it is possible to resume the reproduction of the master-audio-track 285, 286, and simultaneously to define the current video clip segment in-point/end-point setting and append the selected segment of source video to the previous one, the in-point and the end-point of which are defined by the succession of the last two Start/Stop commands;

the procedure continues until the master-audio-track or the source video has ended 289, 290. In case of master audio track not ended, the potential insufficient duration of the assembled video is extended by repeating the frames from the beginning and concatenating them until reaching the exact duration of the master-sound-track;

optionally, if the source video also contains its own audio track, it is possible to choose a mixing mode of the same with the master-audio-track, instead of deleting the first one, as shown in FIG. 7C.

In summary, the essence of the present invention consists in offering the user a tool for generating an original final assembled video 301 by instant assembling of video clips while listening to an audio track. The final assembled video is the result of an interactive selection of segments of video clips extracted from various video clips available in a data-pack, operated by the user through commands available in the user interface, which determines a final assembled video sequence of segments of video clips 301 named Performance.

In practice, it has been found that the invention fully fulfills the intended aim and objects. In particular, it has been seen how the system and the method for instant assembling of video clips through user performance thus conceived allow to overcome the qualitative limits of the known art, as they allow to obtain better results than those obtainable with known solutions and/or similar results at lower cost and with higher performance.

An advantage of the system and of the method for the instant assembling of video clips through user performance according to the present invention consists in the fact that they foster and allow a creative and music-inspired approach to the making of the videos, being designed for this purpose as regards the features offered, operational paradigms and user interface.

Another advantage of the system and method for instant assembling of video clips through user performance according to the present invention consists in the fact that they provide specific means and methods for the creation of an original video through the real-time assembling of video clips operated through a user performance.

A further advantage of the system and method for the instant assembling of video clips through user performance according to the present invention consists in the fact that user performance can be evaluated according to a Reward method, possibly allowing access to additional audiovisual content.

Furthermore, an advantage of the system and of the method for the instant assembling of video clips through user performance according to the present invention consists in the fact that every single recording session made by the user is unique, being based exclusively on instant visual-acoustic perception, by the same user, on a gestural interaction that is never perfectly repeatable and which can affect the availability of audiovisual content.

Although the system and method for instant assembling of video clips through user performance according to the invention have been designed in particular for field of audiovisual applications offering a gaming experience, they can still be used, more generally, for the field video editing and digital advertising applications, configuring the PBVF as a new type of interactive video ads format.

The invention thus conceived is susceptible of numerous modifications and variations, all of which are within the scope of the appended claims. Furthermore, all the details may be replaced by other technically equivalent elements.

In practice, the materials used, as long as they are compatible with the specific use, as well as the contingent shapes and sizes, may be any according to the needs and the state of the art.

In conclusion, the scope of protection of the claims should not be limited by the preferred illustrations or embodiments illustrated in the description in the form of examples, but rather the claims must include all the patentable novelty features residing in the present invention, including all the characteristics that would be treated as equivalent by the expert in the art.

The disclosures in Italian Patent Application No. 102019000004823 from which this application claims priority are incorporated herein by reference.

The invention claimed is:

1. A system for instant concatenation of video content items by performance, comprising a device operated by a user, wherein said device comprises:
   user interface means configured for input and output interaction with said user;
   a processing unit and a memory configured for creating a video content item by concatenating one after the other a plurality of video segments extracted from a plurality of source video content items;
   an I/O unit configured for access to said plurality of source video content items locally or via a telematic communication network; and
   said user interface means are configured to detect a sequence of manual concatenation commands performed by said user, and to play one after the other said plurality of video segments extracted from said plurality of source video content items, a display order of the video segments being defined by said sequence of manual concatenation commands;
   said processing unit and said memory are configured to record one after the other said plurality of video segments extracted from said plurality of source video content items, resulting in said video content item, a recording order of the video segments being defined by said sequence of manual concatenation commands;
   wherein the detection of a manual concatenation command induces a transition from a first source video content item, currently displayed and recorded, to a second source video content item; and
   a logic system for enabling a hidden portion of said plurality of source video content items and, optionally, of an audio content item, made accessible according to reward criteria based on the assessment of said sequence of manual concatenation commands.

2. The system for instant concatenation of video content items by performance according to claim 1, wherein said device further comprises a loudspeaker configured to play the audio content item, said I/O unit being configured for access to said audio content item locally or via said telematic communication network, said processing unit and said memory being configured to record said audio content item in combination with said video content item, comprising said plurality of video segments extracted from said plurality of source video content items.

3. The system for instant concatenation of video content items by performance according to claim 1, further comprising:
   a storage unit on a cloud server, configured for storing said plurality of source video content items and optionally said audio content item; and
   a video processing and generation unit on a cloud server, configured for the streaming transmission of said plurality of source video content items and optionally of said audio content item toward said device.

4. The system for instant concatenation of video content items by performance according to claim 1, further comprising a web platform for authoring and publishing on a cloud server, configured for creation of a data pack which defines said plurality of source video content items, said audio content item, said sequence of manual concatenation commands and other functionalities, and for publication of said data pack.

5. The system for instant concatenation of video content items by performance according to claim 1, further comprising a procedure for local authoring on said device, configured to create a data pack which defines said plurality of source video content items, said audio content item, said sequence of manual concatenation commands, and other functionalities.

6. The system for instant concatenation of video content items by performance according to claim 5, wherein said data pack is defined according to a multimedia presentation format termed PBVF (Performance Based Video Format) formalized as follows:

```
PVBFFormat ::= SET {
sources     SEQUENCE OF Source,
audio                 OPTIONAL Audio,
cover                 OPTIONAL Content,
performances OPTIONAL SEQUENCE OF Performance,
defaultPerformance OPTIONAL INTEGER,
videoSegments OPTIONAL SEQUENCE OF VideoSegment,
specialKeys OPTIONAL SEQUENCE OF SpecialKey
}
Source ::= SEQUENCE {
sourceType SourceType,
content Content,
offset                OPTIONAL INTEGER
}
SourceType :: ENUMERATED {
jpg                   (0),
png                   (2),
gif                   (3),
mp4                   (4),
avi                   (5),
m3u8                  (6),
ts                    (7),
}
Audio ::= SEQUENCE {
content Content
offset                OPTIONAL INTEGER
}
Content ::= CHOICE {
local                 OCTET STRING,
remote IA5String
}
Performance ::= SEQUENCE {
sourceIndex           INTEGER,
duration              INTEGER,
filter                OPTIONAL Filter
}
Filter ::= ENUMERATED {
steel                 (0),
zoomIn                (1),
zoomOut               (2),
tilt                  (3),
blur                  (4),
overexpose            (5),
underexpose           (6)
}
VideoSegment ::= SEQUENCE {
Tag                   UTF8String,
source Source,
start                 OPTIONAL INTEGER,
end                   OPTIONAL INTEGER
}
SpecialKey ::= SEQUENCE {
```

-continued

| | |
|---|---|
| icon | Content |
| index | INTEGER |
| threshold | INTEGER |
| }. | |

7. The system for instant concatenation of video content items by performance according to claim 5, wherein said user interface means of said device are configured according to an operating mode known as TAGGED, with corresponding commands and associated graphic layout, which allows a selected insertion of video segments extracted from said plurality of source video content items, previously indexed during the procedure for the authoring of the data pack, by manual annotation or by means of an automatic method for frame analysis.

8. The system for instant concatenation of video content items by performance according to claim 1, wherein said user interface means of said device are configured according to an operating mode known as REPEAT, with corresponding commands and associated graphic layout, which allows to repeat a final portion of a source video content, currently displayed and recorded, optionally altering the order of the frames.

9. A method for instant concatenation of video content items by performance, by means of a device operated by a user, comprising the steps of:
- accessing a plurality of source video content items locally or via a telematic communication network, by means of an I/O unit of said device;
- detecting a sequence of manual concatenation commands performed by said user, by means of user interface means of said device;
- playing one after the other a plurality of video segments extracted from said plurality of source video content items, by virtue of said user interface means of said device, the display order of the video segments being defined by said sequence of manual concatenation commands;
- recording one after the other said plurality of video segments extracted from said plurality of source video content items, leading to a video content, by means of a processing unit and a memory of said device, the recording order of the video segments being defined by said sequence of manual concatenation commands,
- wherein the detection of a manual concatenation command induces the transition from a first source video content item, currently displayed and recorded, to a second source video content item;
- accessing an audio content item locally or via said telematic communication network, by means of said I/O unit of said device;
- playing said audio content item, by means of a loudspeaker of said device; and
- recording said audio content item in combination with said video content item, comprising said plurality of video segments extracted from said plurality of source video content items, by means of said processing unit and said memory of said device;
- creating a data pack which defines said plurality of source video content items, and optionally, said audio content item, said sequence of manual concatenation commands and other functionalities, by means of a web platform for authoring and publishing on a cloud server; and
- publishing said data pack, by means of said web platform for authoring and publishing on a cloud server.

10. The method for instant concatenation of video content items by performance according to claim 9, further comprising the steps of:
- storing said plurality of source video content items and optionally said audio content item, by means of a storage unit on a cloud server; and
- transmitting in streaming mode said plurality of source video content items and optionally said audio content item toward said device, by means of a video processing and generation unit on a cloud server.

11. The method for instant concatenation of video content items by performance according to claim 9, further comprising the steps of:
- creating a data pack which defines said plurality of source video content items, said audio content item, said sequence of manual concatenation commands and other functionalities, by means of a procedure for local authoring on said device; and
- publishing said data pack via said web platform for authoring and publishing on a cloud server.

12. The method for instant concatenation of video content items by performance according to claim 9, wherein a data pack is defined according to a multimedia presentation format termed PBVF (Performance Based Video Format), formalized as follows:

```
PVBFFormat ::= SET {
sources SEQUENCE OF Source,
audio             OPTIONAL Audio,
cover             OPTIONAL Content,
performances OPTIONAL SEQUENCE OF Performance,
defaultPerformance OPTIONAL INTEGER,
videoSegments OPTIONAL SEQUENCE OF VideoSegment,
specialKeys OPTIONAL SEQUENCE OF SpecialKey
}
Source ::= SEQUENCE {
sourceType SourceType,
content Content,
offset             OPTIONAL INTEGER
}
SourceType :: ENUMERATED {
jpg               (0),
png               (2),
gif               (3),
mp4               (4),
avi               (5),
m3u8              (6),
ts                (7),
}
Audio ::= SEQUENCE {
content Content
offset             OPTIONAL INTEGER
}
Content ::= CHOICE {
local             OCTET STRING,
remote IA5String
}
Performance ::= SEQUENCE {
sourceIndex       INTEGER,
duration          INTEGER,
filter            OPTIONAL Filter
}
Filter ::= ENUMERATED {
steel             (0),
zoomIn            (1),
zoomOut           (2),
tilt              (3),
blur              (4),
overexpose        (5),
underexpose       (6)
}
VideoSegment ::= SEQUENCE {
```

-continued

```
Tag                UTF8String,
source Source,
start              OPTIONAL INTEGER,
end                OPTIONAL INTEGER
}
SpecialKey ::= SEQUENCE {
icon               Content
index              INTEGER
threshold          INTEGER
}.
```

13. The method for instant concatenation of video content items by performance according to claim 9, further comprising a logic system for enabling a hidden portion of said plurality of source video content items and of said audio content item, made accessible according to reward criteria based on the assessment of said sequence of manual concatenation commands.

14. A system for instant concatenation of video content items by performance, comprising a device operated by a user, wherein said device comprises:
   user interface means configured for input and output interaction with said user;
   a processing unit and a memory configured for creating a video content item by concatenating one after the other a plurality of video segments extracted from a plurality of source video content items;
   an I/O unit configured for access to said plurality of source video content items locally or via a telematic communication network,
   said user interface means are configured to detect a sequence of manual concatenation commands performed by said user, and to play one after the other said plurality of video segments extracted from said plurality of source video content items, a display order of the video segments being defined by said sequence of manual concatenation commands;
   said processing unit and said memory are configured to record one after the other said plurality of video segments extracted from said plurality of source video content items, resulting in said video content item, a recording order of the video segments being defined by said sequence of manual concatenation commands,
   wherein the detection of a manual concatenation command induces a transition from a first source video content item, currently displayed and recorded, to a second source video content item; and
   a web platform for authoring and publishing on a cloud server, configured for creation of a data pack which defines said plurality of source video content items, an optional audio content item, said sequence of manual concatenation commands and other functionalities, and for publication of said data pack.

15. A method for instant concatenation of video content items by performance, by means of a device operated by a user, comprising the steps of:
   accessing a plurality of source video content items locally or via a telematic communication network, by means of an I/O unit of said device;
   detecting a sequence of manual concatenation commands performed by said user, by means of user interface means of said device;
   playing one after the other a plurality of video segments extracted from said plurality of source video content items, by virtue of said user interface means of said device, the display order of the video segments being defined by said sequence of manual concatenation commands;
   recording one after the other said plurality of video segments extracted from said plurality of source video content items, leading to a video content, by means of a processing unit and a memory of said device, the recording order of the video segments being defined by said sequence of manual concatenation commands,
   wherein the detection of a manual concatenation command induces the transition from a first source video content item, currently displayed and recorded, to a second source video content item;
   creating a data pack which defines said plurality of source video content items, an optional audio content item, said sequence of manual concatenation commands and other functionalities, by means of a procedure for local authoring on said device; and
   publishing said data pack via said web platform for authoring and publishing on a cloud server.

16. A system for instant concatenation of video content items by performance, comprising a device operated by a user, wherein said device comprises:
   user interface means configured for input and output interaction with said user;
   a processing unit and a memory configured for creating a video content item by concatenating one after the other a plurality of video segments extracted from a plurality of source video content items;
   an I/O unit configured for access to said plurality of source video content items locally or via a telematic communication network;
   said user interface means are configured to detect a sequence of manual concatenation commands performed by said user, and to play one after the other said plurality of video segments extracted from said plurality of source video content items, a display order of the video segments being defined by said sequence of manual concatenation commands;
   said processing unit and said memory are configured to record one after the other said plurality of video segments extracted from said plurality of source video content items, resulting in said video content item, a recording order of the video segments being defined by said sequence of manual concatenation commands,
   wherein the detection of a manual concatenation command induces a transition from a first source video content item, currently displayed and recorded, to a second source video content item; and
   a procedure for local authoring on said device, configured to create a data pack which defines said plurality of source video content items, an optional audio content item, said sequence of manual concatenation commands, and other functionalities.

17. A system for instant concatenation of video content items by performance, comprising a device operated by a user, wherein said device comprises:
   user interface means configured for input and output interaction with said user;
   a processing unit and a memory configured for creating a video content item by concatenating one after the other a plurality of video segments extracted from a plurality of source video content items; and
   an I/O unit configured for access to said plurality of source video content items locally or via a telematic communication network;

said user interface means are configured to detect a sequence of manual concatenation commands performed by said user, and to play one after the other said plurality of video segments extracted from said plurality of source video content items, a display order of the video segments being defined by said sequence of manual concatenation commands;

said processing unit and said memory are configured to record one after the other said plurality of video segments extracted from said plurality of source video content items, resulting in said video content item, a recording order of the video segments being defined by said sequence of manual concatenation commands;

wherein the detection of a manual concatenation command induces a transition from a first source video content item, currently displayed and recorded, to a second source video content item, wherein said user interface means of said device are configured according to an operating mode known as REPEAT, with corresponding commands and associated graphic layout, which allows to repeat a final portion of a source video content, currently displayed and recorded, optionally altering the order of the frames.

18. A method for instant concatenation of video content items by performance, by means of a device operated by a user, comprising the steps of:
accessing a plurality of source video content items locally or via a telematic communication network, by means of an I/O unit of said device;
detecting a sequence of manual concatenation commands performed by said user, by means of user interface means of said device;
playing one after the other a plurality of video segments extracted from said plurality of source video content items, by virtue of said user interface means of said device, the display order of the video segments being defined by said sequence of manual concatenation commands; and
recording one after the other said plurality of video segments extracted from said plurality of source video content items, leading to a video content, by means of a processing unit and a memory of said device, the recording order of the video segments being defined by said sequence of manual concatenation commands,
wherein the detection of a manual concatenation command induces the transition from a first source video content item, currently displayed and recorded, to a second source video content item,
wherein a data pack is defined according to a multimedia presentation format termed PBVF (Performance Based Video Format), formalized as follows:

```
PVBFFormat ::= SET {
sources    SEQUENCE OF Source,
audio      OPTIONAL Audio,
cover      OPTIONAL Content,
performances OPTIONAL SEQUENCE OF Performance,
defaultPerformance OPTIONAL INTEGER,
videoSegments OPTIONAL SEQUENCE OF VideoSegment,
specialKeys OPTIONAL SEQUENCE OF SpecialKey
}
Source ::= SEQUENCE {
sourceType SourceType,
content    Content,
offset     OPTIONAL INTEGER
}
SourceType :: ENUMERATED {
```

-continued

```
jpg        (0),
png        (2),
gif        (3),
mp4        (4),
avi        (5),
m3u8       (6),
ts         (7),
}
Audio ::= SEQUENCE {
content Content
offset     OPTIONAL INTEGER
}
Content ::= CHOICE {
local      OCTET STRING,
remote IA5 String
}
Performance ::= SEQUENCE {
sourceindex          INTEGER,
duration             INTEGER,
filter               OPTIONAL Filter
}
Filter ::= ENUMERATED {
steel      (0),
zoomIn (1),
zoomOut    (2),
tilt       (3),
blur       (4),
overexpose (5),
underexpose (6)
} ::= SEQUENCE {
VideoSegment
Tag                  UTF8String,
source Source,
start                OPTIONAL INTEGER,
end                  OPTIONAL INTEGER
}
SpecialKey ::= SEQUENCE{
icon       Content
index      INTEGER
threshold  INTEGER
}.
```

19. A method for instant concatenation of video content items by performance, by means of a device operated by a user, comprising the steps of:
accessing a plurality of source video content items locally or via a telematic communication network, by means of an I/O unit of said device;
detecting a sequence of manual concatenation commands performed by said user, by means of user interface means of said device;
playing one after the other a plurality of video segments extracted from said plurality of source video content items, by virtue of said user interface means of said device, the display order of the video segments being defined by said sequence of manual concatenation commands; and
recording one after the other said plurality of video segments extracted from said plurality of source video content items, leading to a video content, by means of a processing unit and a memory of said device, the recording order of the video segments being defined by said sequence of manual concatenation commands,
wherein the detection of a manual concatenation command induces the transition from a first source video content item, currently displayed and recorded, to a second source video content item; and
a logic system for enabling a hidden portion of said plurality of source video content items and of an optional audio content item, made accessible according to reward criteria based on the assessment of said sequence of manual concatenation commands.

* * * * *

UNITED STATES PATENT AND TRADEMARK OFFICE
CERTIFICATE OF CORRECTION

| | |
|---|---|
| PATENT NO. | : 11,551,724 B2 |
| APPLICATION NO. | : 17/600824 |
| DATED | : January 10, 2023 |
| INVENTOR(S) | : Mario Amura |

It is certified that error appears in the above-identified patent and that said Letters Patent is hereby corrected as shown below:

On the Title Page

Item (73) Assignee
Please remove Assignee information

Signed and Sealed this
Seventh Day of March, 2023

*Katherine Kelly Vidal*

Katherine Kelly Vidal
*Director of the United States Patent and Trademark Office*